US012261415B2

(12) United States Patent
Kawasaki et al.

(10) Patent No.: US 12,261,415 B2
(45) Date of Patent: Mar. 25, 2025

(54) EFFECTIVE COMPONENT GENERATION DEVICE AND METHOD FOR MANUFACTURING SAME

(71) Applicant: Panasonic Intellectual Property Management Co., Ltd., Osaka (JP)

(72) Inventors: Motoji Kawasaki, Shiga (JP); Kouiti Hirai, Shiga (JP); Mikio Ito, Shiga (JP); Yutaka Uratani, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 705 days.

(21) Appl. No.: 17/621,163

(22) PCT Filed: Jun. 18, 2020

(86) PCT No.: PCT/JP2020/023998
§ 371 (c)(1),
(2) Date: Dec. 20, 2021

(87) PCT Pub. No.: WO2020/262196
PCT Pub. Date: Dec. 30, 2020

(65) Prior Publication Data
US 2022/0355317 A1 Nov. 10, 2022

(30) Foreign Application Priority Data
Jun. 26, 2019 (JP) ................................ 2019-119110

(51) Int. Cl.
*H01T 19/00* (2006.01)
*B05B 5/03* (2006.01)
*B05B 5/053* (2006.01)

(52) U.S. Cl.
CPC ................ *H01T 19/00* (2013.01); *B05B 5/03* (2013.01); *B05B 5/0533* (2013.01)

(58) Field of Classification Search
CPC .......... H01T 19/00; H01T 23/00; B05B 5/03; B05B 5/0533; B05B 5/0535; B05B 5/16; B05B 5/04; A61L 9/22
(Continued)

(56) References Cited

U.S. PATENT DOCUMENTS 6,225,554 B1 * 5/2001 Trehan ................ H05K 9/0062 174/371
2012/0081831 A1 * 4/2012 Ishii ........................ F24F 13/32 361/231
(Continued)

FOREIGN PATENT DOCUMENTS

CN 102149977 A 8/2011
CN 104115351 A 10/2014
(Continued)

OTHER PUBLICATIONS

English Translation of Chinese Search Report dated Sep. 28, 2022 for the related Chinese Patent Application No. 202080044215.7.
(Continued)

*Primary Examiner* — Jason L McCormack
(74) *Attorney, Agent, or Firm* — Rimon P.C.

(57) ABSTRACT

Effective component generation device includes internal component and case. Internal components include discharger that generates an effective component. Case is formed in a box shape having discharge port through which an effective component is discharged, and houses internal components. Case includes metal body including a bottom plate and peripheral walls surrounding at least discharger in internal component. Metal body has seamless portion at a corner portion between two surfaces of adjacent peripheral walls oriented in different directions. As a result, there is provided effective component generation device capable of suppressing electromagnetic noise radiated to the outside of
(Continued)

case and reducing an influence of electromagnetic noise to the outside.

15 Claims, 12 Drawing Sheets

(58) Field of Classification Search
USPC ........................................................ 250/423 R
See application file for complete search history.

(56) References Cited

U.S. PATENT DOCUMENTS

| | | | | |
|---|---|---|---|---|
| 2014/0203117 | A1* | 7/2014 | Yano | B05B 7/0075 239/690 |
| 2015/0083931 | A1* | 3/2015 | Temporin | H01T 23/00 250/426 |

FOREIGN PATENT DOCUMENTS

| | | | |
|---|---|---|---|
| JP | S57-172635 | A | 10/1982 |
| JP | S63-061187 | U | 4/1988 |
| JP | 3-022544 | U | 3/1991 |
| JP | 2009-231472 | A | 10/2009 |
| JP | 2010-065971 | A | 3/2010 |
| JP | 2010-286125 | A | 12/2010 |
| JP | 2011-183015 | A | 9/2011 |
| JP | 2013-119076 | A | 6/2013 |
| JP | 2013-218807 | A | 10/2013 |
| WO | 2010/029713 | A1 | 3/2010 |
| WO | 2011/036873 | A1 | 3/2011 |
| WO | 2013/035453 | A1 | 3/2013 |
| WO | 2013/084601 | A1 | 6/2013 |

OTHER PUBLICATIONS

Extended European Search Report dated Jul. 15, 2022 for the related European Patent Application No. 20833587.7.

Extended European Search Report dated Jul. 18, 2022 for the related European Patent Application No. 20832774.2.

International Search Report issued in corresponding International Patent Application No. PCT/JP2020/023998, dated Sep. 8, 2020, with English translation.

* cited by examiner

EFFECTIVE COMPONENT GENERATION DEVICE AND METHOD FOR MANUFACTURING SAME

CROSS-REFERENCE OF RELATED APPLICATIONS

This application is the U.S. National Phase under 35 U.S.C. § 371 of International Patent Application No. PCT/JP2020/023998, filed on Jun. 18, 2020, which in turn claims the benefit of Japanese Application No. 2019-119110, filed on Jun. 26, 2019, the entire disclosures of which Applications are incorporated by reference herein.

TECHNICAL FIELD

The present disclosure relates to an effective component generation device and a method for manufacturing the effective component generation device, and more particularly to an effective component generation device including a discharger that generates an effective component, and a method for manufacturing the effective component generation device.

BACKGROUND ART

PTL 1 describes an effective component generation device (electrostatic atomization device) having a configuration in which internal components including a circuit board is housed in a case. The circuit board holds an electrostatic atomization generator including a discharger (discharge electrode), a drive circuit (high voltage application unit), an air blower, and the like. These internal components are housed in the case as one unit.

The case constitutes the shell of the effective component generation device. The circuit board is supported by a support portion provided in the case, and is fixed by a fixing tool. The case is formed of a conductive material such as metal, and the fixing tool for fixing the circuit board to the case also serves as a ground. This reduces electromagnetic noise generated when the effective component generation device performs discharge. Further, the case is provided with an air supply port (hole) into which air flows and a discharge port for charged fine water particles generated by electrostatic atomization.

However, conventionally, the case of the effective component generation device described above is formed in a box shape by bending a metal sheet so as to be able to house the internal components. In the case formed by bending, a gap is generated at a joint of the bent metal sheet or the like. Therefore, the electromagnetic noise leaks from the gap, and an influence of the electromagnetic noise to an outside of the case cannot be sufficiently reduced.

CITATION LIST

Patent Literature

PTL 1: International Publication No. 2013/035453 A

SUMMARY OF THE INVENTION

The present disclosure provides an effective component generation device capable of reducing the influence of electromagnetic noise to an outside of a case, and a method for manufacturing the effective component generation device.

An effective component generation device according to an aspect of the present disclosure includes internal components and a case. The internal components include a discharger that generates an effective component. The case has a box shape having a discharge port for discharging the effective component, and houses the internal components. The case has a metal body including a bottom plate and a peripheral wall surrounding at least the discharger among the internal components. The metal body has a seamless portion at a corner portion between two surfaces of adjacent peripheral walls oriented in different directions.

A method for manufacturing an effective component generation device according to an aspect of the present disclosure includes a case forming step and a housing step. The effective component generation device includes internal components and a case. The internal components include a discharger that generates an effective component. The case has a box shape having a discharge port for discharging the effective component, and houses the internal components. The case forming step is a step of forming a case by drawing a metal sheet. The housing step is a step of housing internal components in the case.

According to the present disclosure, it is possible to more effectively reduce the influence of the electromagnetic noise to the outside the case.

DESCRIPTION OF EMBODIMENTS

First Exemplary Embodiment

Figure 1A:
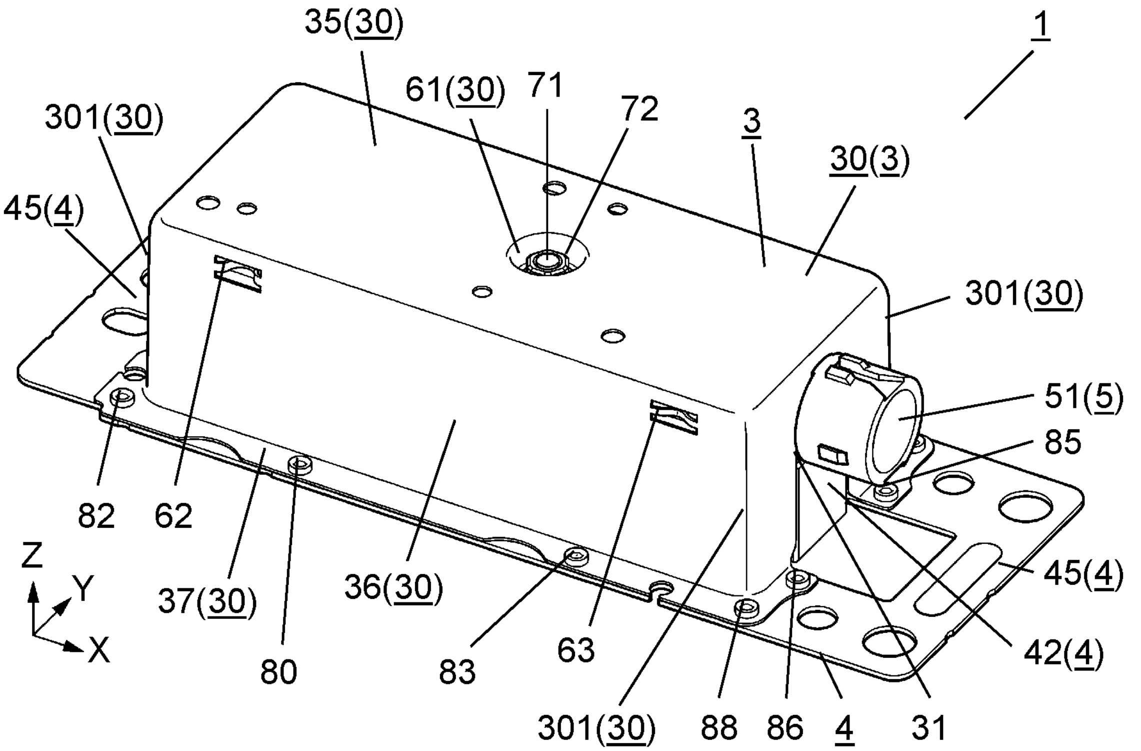
FIG. 1A is a perspective view of an effective component generation device according to a first exemplary embodiment.

Hereinafter, effective component generation device 1 according to a first exemplary embodiment will be described in terms of items with reference to the drawings.

(1) Outline

First, an outline of effective component generation device 1 according to the first exemplary embodiment will be described with reference to FIGS. 1A to 3.

Effective component generation device 1 includes discharger 21 (see FIG. 2) that generates an effective component. In the first exemplary embodiment, discharger 21 includes discharge electrode 211 (see FIG. 5), counter electrode 212 (see FIG. 5), and the like. When a voltage is applied between discharge electrode 211 and counter electrode 212, discharge is generated between the electrodes of discharger 21.

The "effective component" in the present disclosure is a component generated by the discharge of discharger 21. As an example, the effective component means a charged microparticle liquid containing OH radicals, OH radicals, $O_2$ radicals, negative ions, positive ions, ozone, nitrate ions, or the like. These effective components constitute a basis for exerting useful effects in various situations including sterile filtration, odor removal, moisture keeping, freshness keeping, and virus inactivation.

Effective component generation device 1 includes case 3 in addition to internal components 2 (see FIG. 2) including discharger 21. Case 3 constitutes an outer shell of effective component generation device 1. Case 3 houses internal components 2 therein. Thus, effective component generation device 1 that is unitized is configured. Case 3 has discharge port 31 through which an effective component is discharged and air supply port 32 through which air is taken into case 3.

Internal components 2 further include air blower 22. Air blower 22 generates an air flow (wind) flowing from air supply port 32 of case 3 toward discharge port 31. As a result, an air taken into case 3 from air supply port 32 is discharged to the outside of case 3 from discharge port 31. As a result, the effective component generated in discharger 21 is discharged to the outside of case 3 through discharge port 31 along with an airflow generated in air blower 22.

That is, effective component generation device 1 of the first exemplary embodiment includes internal components 2 including discharger 21, and case 3. Discharger 21 generates the effective component. Case 3 is formed in a box shape having air supply port 32 and discharge port 31. Discharge port 31 is a port (opening) for releasing the effective component. Case 3 houses internal components 2. Case 3 has metal body 30 including at least bottom plate 35 and peripheral walls 36. Metal body 30 surrounds at least discharger 21 of internal components 2. That is, hereinafter, a case where the metal body and the case are made of the same element will be described as an example, but since the metal body only needs to be configured to surround the discharger, only a part of the case may be constituted from the metal body. Metal body 30 has seamless portion 301 at a corner portion between two surfaces of adjacent peripheral walls 36 oriented in different directions (X direction and Y direction).

Note that the "seamless portion" of the present disclosure means a portion that seamlessly connects two surfaces of adjacent peripheral walls 36 at a corner portion between the two adjacent surfaces of peripheral walls 36 oriented in different directions.

That is, seamless portion 301 fills at least a part of a gap between the two surfaces of adjacent peripheral walls 36 at the corner portion of peripheral walls 36. Thus, the two surfaces of adjacent peripheral walls 36 are continuously connected seamlessly.

Note that seamless portion 301 may be configured to reduce the gap so as to fill at least a part of the gap between the two surfaces of adjacent peripheral walls 36. Therefore, seamless portion 301 includes both a configuration in which the gap is completely filled and a configuration in which only a part of the gap is filled. That is, seamless portion 301 may be configured to close at least a part of the gap so as to reduce the gap between the two surfaces of adjacent peripheral walls 36 at each corner portion of metal body 30. Therefore, in effective component generation device 1 of the first exemplary embodiment, although there are seamless portions 301, there may be a configuration in which there is a slight gap or hole at a corner portion between two surfaces of adjacent peripheral walls 36 oriented in different directions in metal body 30.

As described above, according to effective component generation device 1 of the first exemplary embodiment, at least discharger 21 is surrounded by metal body 30. Therefore, metal body 30 functions as a shield against electromagnetic noise generated at the time of discharge in discharger 21.

Further, metal body 30 has a seamless portion 301 at each corner portion between two surfaces of adjacent peripheral walls 36 oriented in different directions. Seamless portion 301 makes it possible to reduce the electromagnetic noise leaking from the gap at the corner portion between the two surfaces of adjacent peripheral walls 36. That is, according to effective component generation device 1, there is an advantage that the influence of the electromagnetic noise to the outside of case 3 can be more actively reduced.

(2) Details

Next, details of effective component generation device 1 according to the first exemplary embodiment will be described with reference to FIGS. 1A to 10.

In the following description, as an example, three axes of an X-axis, a Y-axis, and a Z-axis orthogonal to each other are set as illustrated in the drawings. Specifically, an axis along a longitudinal direction of case 3 is referred to as the "X-axis", and an axis along a direction in which case 3 and lid body 4 are combined is referred to as the "Z-axis". The "Y-axis" is an axis orthogonal to both the X-axis and the Z-axis and extending along a lateral direction of case 3. Further, a direction in which the effective component is released from discharge port 31 of case 3 is defined as a positive direction of the X-axis, and a side of case 3 viewed from lid body 4 is defined as a positive direction of the Z-axis. In addition, hereinafter, a state viewed from the positive direction of the Z-axis may be referred to as a "plan view". Each of the X-axis, Y-axis, and Z-axis is a virtual axis. Arrows denoted as "X", "Y", and "Z" in drawings express the X-axis, Y-axis, and Z-axis, respectively, for better description, and do not represent axes as real entity. It should be noted that these directions are not intended to specify the direction of use of effective component generation device 1.

Hereinafter, as an example, a case where effective component generation device 1 is mounted in a vehicle will be described. That is, effective component generation device 1 is disposed inside a dashboard, for example. As a result, effective component generation device 1 is used in such a manner that an effective component is released into a duct of an in-vehicle air conditioning facility and the effective component is released into the vehicle using a blow-out port of the air conditioning facility.

(2.1) Overall Configuration

Next, an overall configuration of effective component generation device 1 according to the first exemplary embodiment will be described with reference to FIGS. 1A to 3.

As described above, effective component generation device 1 according to the first exemplary embodiment includes internal components 2 including discharger 21, and case 3. Discharger 21 generates an effective component by discharging. Case 3 is formed in a box shape having discharge port 31 through which an effective component is released. Effective component generation device 1 further includes lid body 4, buffer 41 (see FIG. 2), air passage member 5, and the like in addition to internal components 2 and case 3.

Lid body 4 is joined to case 3. Case 3 has opening 33 formed in peripheral walls 36 separately from discharge port 31. Lid body 4 is joined to case 3 so as to close opening 33 in a state where internal components 2 are housed between lid body 4 and case 3. That is, case 3 is formed in a box shape in which one surface (one surface orthogonal to the Z-axis) is opened as opening 33. Lid body 4 is joined to case 3 to close opening 33. Thus, lid body 4 constitutes an outer shell of effective component generation device 1 together with case 3. Internal components 2 are housed in an inner space of case 3 surrounded by case 3 and lid body 4. As a result, internal components 2 are covered with lid body 4 so as not to be exposed from opening 33 in a state of being assembled in case 3 from opening 33.

A joint structure between case 3 and lid body 4 will be described in detail in a section of "(2.5) Joint structure between case and lid body".

Case 3 of the first exemplary embodiment is formed of, for example, a conductive metal sheet such as SECD. Therefore, entire case 3 is metal body 30 made of metal. Similarly to case 3, lid body 4 is also formed of a conductive metal sheet. Therefore, entire lid body 4 is also made of metal. As a result, internal components 2 are housed in a space surrounded by metal members (case 3 and lid body 4).

As will be described in detail in a section of "(2.6) Fixing structure of internal component", internal components 2 are fixed to case 3 and housed in case 3. Further, case 3 will be described in detail in a section of "(2.4) Detailed configuration of case".

Lid body 4 is formed in a rectangular shape with the X-axis direction as a longitudinal direction and the Y-axis direction as a lateral direction in plan view. Lid body 4 includes first closing piece 42 that closes a part of discharge port 31 of case 3 and second closing piece 43 that closes a part of connector port 34 of case 3. Each of first closing piece 42 and second closing piece 43 is formed by a cut-and-raised portion (cut-and-bent portion) of a metal sheet constituting lid body 4. Lid body 4 further includes ribs 44 extending in the longitudinal direction (X-axis direction). Ribs 44 reinforce strength against bending or the like of lid body 4.

Lid body 4 is formed to have a dimension in which the longitudinal direction is larger than that of case 3. Therefore, in a state where lid body 4 is joined to case 3, at least both end portions of lid body 4 in the longitudinal direction protrude outward from case 3 in plan view. That is, lid body 4 has overhanging portions 45 overhanging outward from outer peripheral edges of case 3 in the X-axis direction in plan view. In effective component generation device 1, overhanging portions 45 of lid body 4 are, for example, screwed to an attachment object (In the first exemplary embodiment, for example, a vehicle). As a result, effective component generation device 1 is attached to the attachment object such as a vehicle.

Buffer 41 is disposed between lid body 4 and a part of internal components 2, and sandwiched therebetween. That is, buffer 41 is housed together with internal components 2 in the inner space of case 3 surrounded by case 3 and lid body 4. In the first exemplary embodiment, buffer 41 is attached to lid body 4 which is an opposing surface facing case 3.

Specifically, buffer 41 is disposed so as to be sandwiched between air blower 22 which is a part of internal components 2, and lid body 4. That is, internal component 2 includes air blower 22 that generates an air flow for outputting the effective component from discharge port 31 to the outside of case 3. Buffer 41 is disposed in contact with at least air blower 22.

Therefore, air blower 22 is not brought into direct contact with lid body 4, and buffer 41 is interposed between air blower 22 and lid body 4. Buffer 41 is made of a material having elasticity. As an example, buffer 41 is formed of a cushion material such as ethylene propylene diene rubber (EPDM) foam. Therefore, in a state where lid body 4 is joined to case 3, buffer 41 is compressed between lid body 4 and air blower 22. As a result, internal components 2 are pressed against bottom surface 310 (see FIG. 4) of bottom plate 35 of case 3 by elastic force of buffer 41. As a result, movement of internal components 2 generated in a direction away from bottom surface 310 of case 3, vibration of internal components 2, and the like are absorbed and suppressed by buffer 41. In the first exemplary embodiment, in particular, buffer 41 is brought into contact with air blower 22 which has a movable portion and thus easily generates mechanical vibration. As a result, mechanical vibration generated in air blower 22 can be effectively suppressed.

Air passage member 5 is housed in case 3. That is, air passage member 5 is housed in the inner space of case 3 surrounded by case 3 and lid body 4 together with internal components 2 and buffer 41. In the first exemplary embodiment, air passage member 5 is disposed between internal component 2 and lid body 4 in a state of being fixed to lid body 4. Air passage member 5 forms an air passage for allowing an air flow (wind) to pass between air supply port 32 and discharge port 31 of case 3. Air passage member 5 divides the inner space of case 3 into a space through which the air flow passes and another space. Accordingly, air passage member 5 forms air passage in case 3.

Air blower 22 and discharger 21 of internal components 2 are disposed in a middle of the air passage formed by air passage member 5. Air blower 22 generates an air flow (wind) flowing from air supply port 32 toward discharge port 31 through the air passage. In the first exemplary embodiment, discharger 21 is disposed on a downstream side of air blower 22 in the air passage, that is, between air blower 22 and discharge port 31.

Therefore, the air taken into case 3 from air supply port 32 moves through the air passage of air passage member 5 to discharge port 31 in case 3, and is discharged from discharge port 31 to the outside of case 3. At this time, the effective component generated in discharger 21 is discharged to the outside of case 3 through discharge port 31 along the airflow generated by air blower 22. That is, air blower 22 is disposed between air supply port 32 and discharger 21 in the air passage. As a result, the effective component generated in discharger 21 is pushed out to discharge port 31 by air blower 22, and discharged to the outside of case 3.

The air passage formed by air passage member 5 includes an air supply passage on an upstream side of air blower 22 and an air discharge passage on the downstream side of air blower 22. The air supply passage connects between air blower 22 and air supply port 32. The air discharge passage connects between air blower 22 and discharge port 31. Accordingly, air passage member 5 controls the flow of air (including the effective component) such that the effective component is relatively efficiently released to the outside of case 3.

Figure 3:
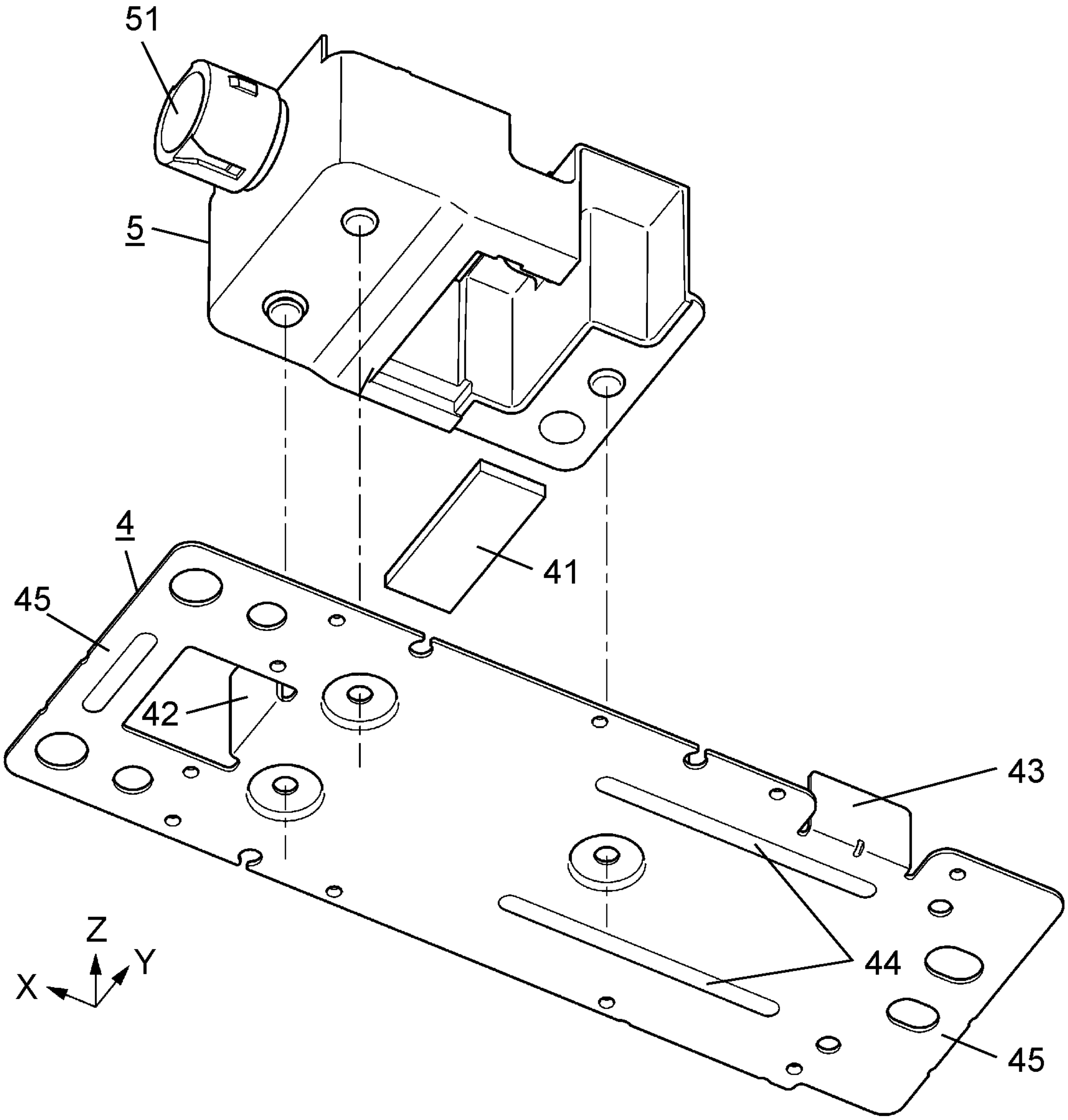
FIG. 3 is an exploded perspective view illustrating a lid body, an air passage member, and a buffer of the effective component generation device.

In the first exemplary embodiment, air passage member 5 is made of a synthetic resin such as polybutylene terephthalate (PBT). Air passage member 5 made of a resin molded article is fixed to lid body 4 made of a metal sheet. As illustrated in FIG. 3, air passage member 5 is fixed to lid body 4 by, for example, a method such as thermal caulking.

Further, air passage member 5 is integrally formed with nozzle 51 that discharges air containing the effective component. That is, effective component generation device 1 of the first exemplary embodiment includes nozzle 51 integrally formed with air passage member 5. Nozzle 51 is disposed in discharge port 31 of case 3. As a result, the air discharged from discharge port 31 to the outside of case 3 is discharged to the outside of case 3 through nozzle 51.

(2.2) Configuration of Internal Components

Figure 2:
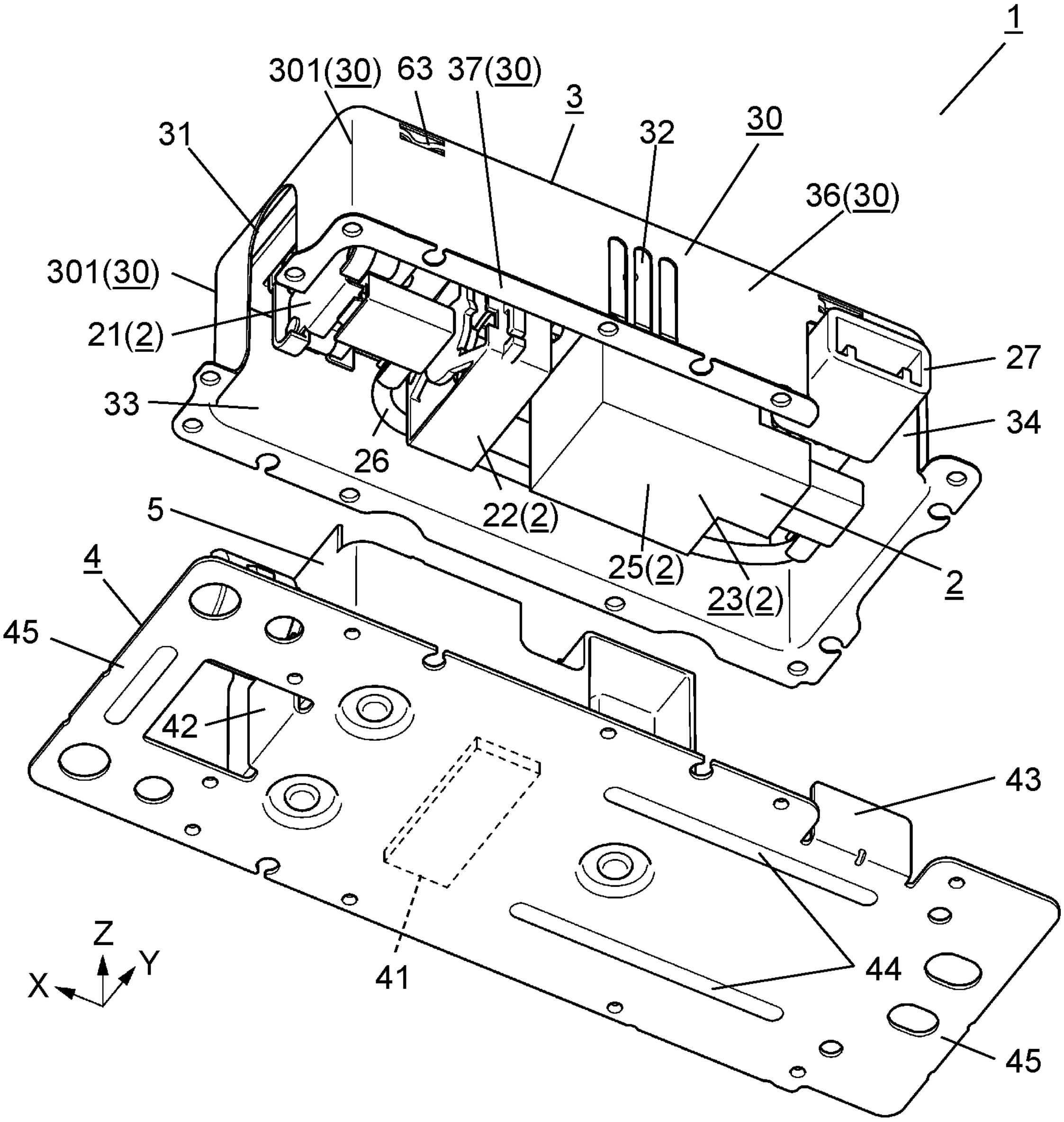
FIG. 2 is an exploded perspective view of the effective component generation device.
Figure 4:
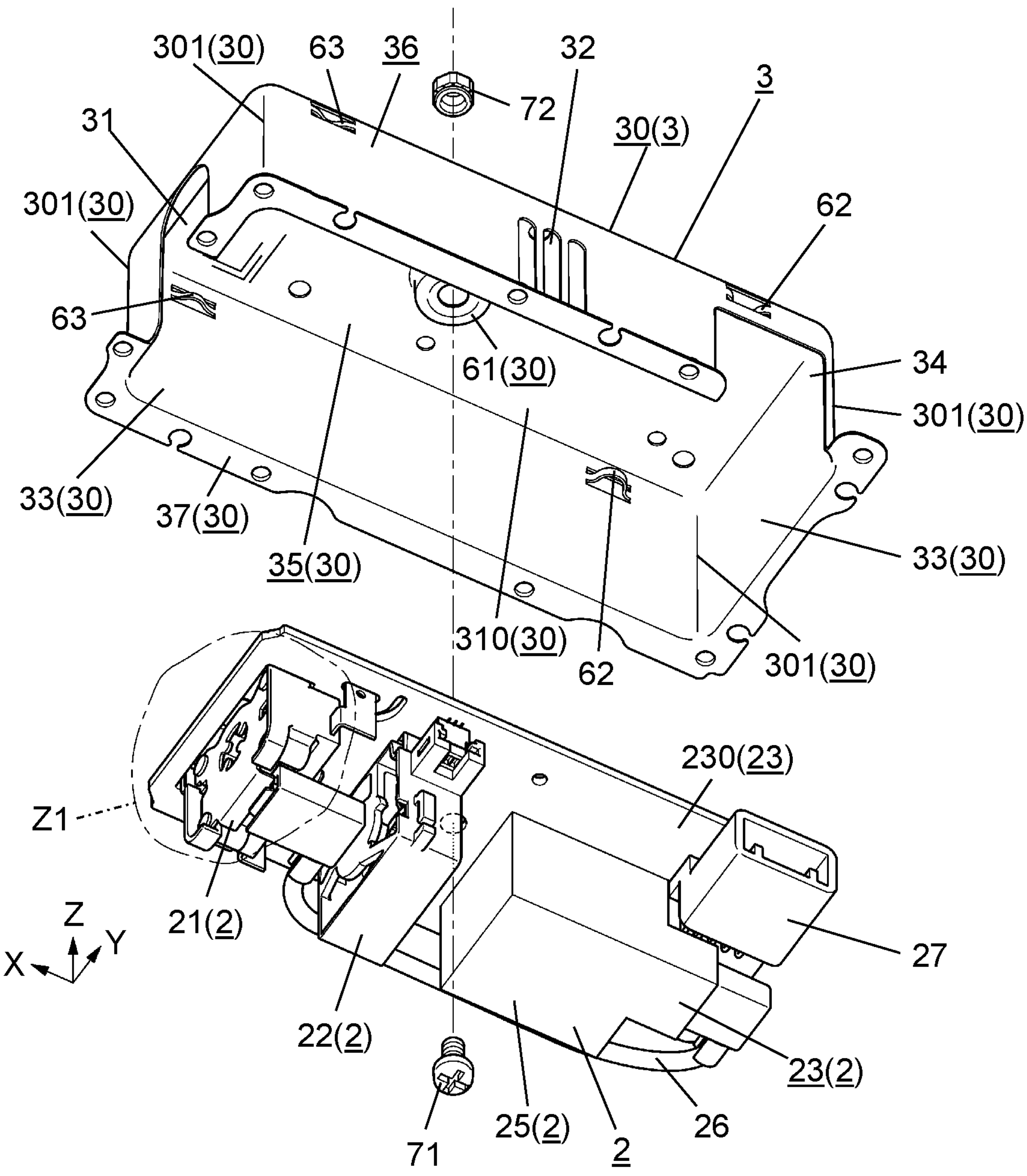
FIG. 4 is an exploded perspective view illustrating a case and internal components of the effective component generation device.

Next, the configuration of internal components 2 will be described with reference to FIGS. 2, 4, and 5.

Internal components 2 further include drive circuit 23 and liquid supply unit 24 (see FIG. 5) in addition to discharger 21 and air blower 22.

Figure 5:
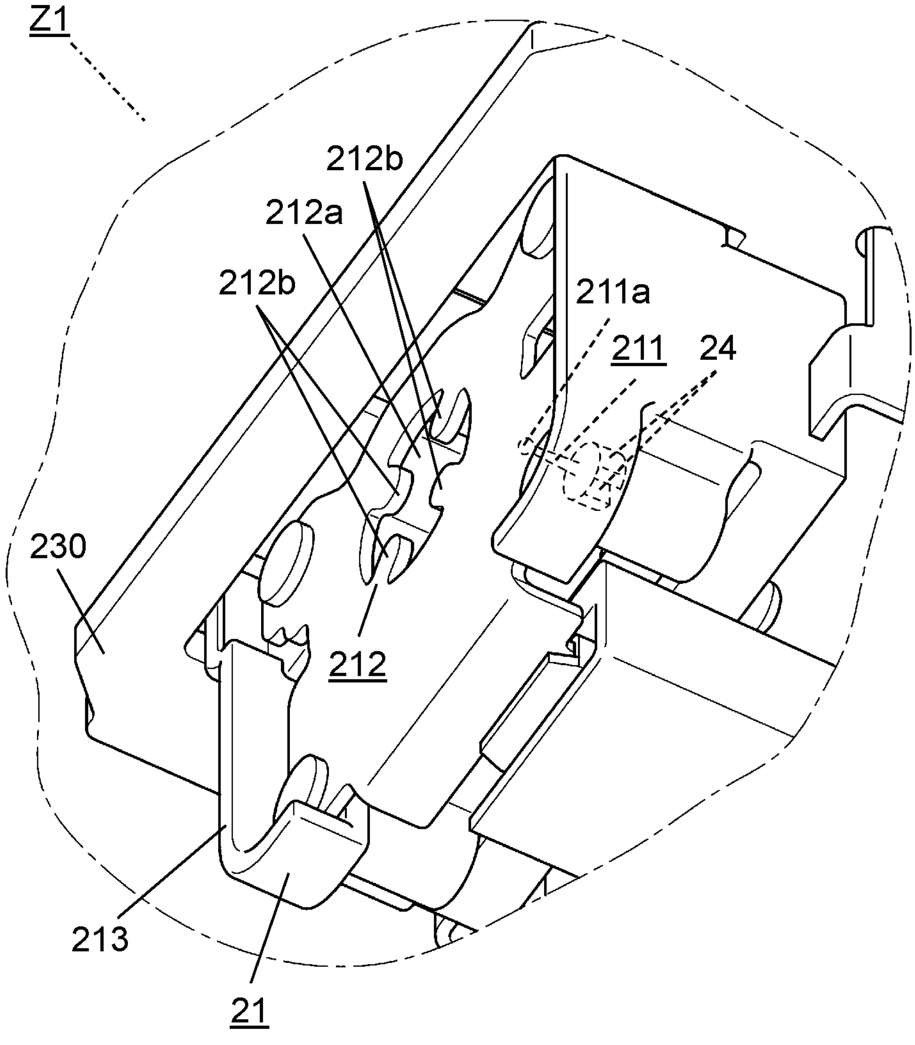
FIG. 5 is a schematic perspective view of enlarged region Z1 in FIG. 4.

As illustrated in FIG. 5, discharger 21 includes discharge electrode 211, counter electrode 212, and the like. Discharger 21 further includes holding block 213 made of an electrically insulating synthetic resin such as syndiotactic polystyrene (SPS).

As described above, discharger 21 generates discharge by applying a voltage between discharge electrode 211 and counter electrode 212.

Discharge electrode 211 is a columnar electrode extending along the X-axis. Discharge electrode 211 is a needle electrode in which at least distal end 211*a* in the longitudinal direction (X-axis direction) is formed in a tapered shape. The "tapered shape" herein is not limited to a shape having a highly sharpened distal end, and includes a shape having a rounded tip. In the example illustrated in FIG. 5, distal end 211*a* of discharge electrode 211 has a spherical shape, specifically, a half (a hemispherical portion on the positive side of the X-axis) of distal end 211*a* facing discharge electrode 211 has a rounded tapered shape. Discharge electrode 211 is made of, for example, a conductive metal material such as a titanium alloy (Ti alloy).

Counter electrode 212 is disposed so as to face distal end 211*a* of discharge electrode 211. In the first exemplary embodiment, counter electrode 212 is formed of a metal sheet, and is disposed at a position away from distal end 211*a* of discharge electrode 211 in the positive direction of the X-axis. Counter electrode 212 has through-hole 212*a* formed in a part of counter electrode 212, and penetrating the metal sheet in a thickness direction (X-axis direction). Further, counter electrode 212 includes a plurality of (for example, four) projecting electrode portions 212*b* formed so as to project from peripheral edges of through-hole 212*a* toward a center of through-hole 212*a*. Counter electrode 212 is made of, for example, a conductive metal material such as a titanium alloy (Ti alloy).

Holding block 213 holds discharge electrode 211 and counter electrode 212. Holding block 213 is coupled to counter electrode 212 by, for example, thermal caulking. As a result, counter electrode 212 is held by holding block 213. In a state where discharge electrode 211 and counter electrode 212 are held by holding block 213, the center of through-hole 212*a* is located on a center axis of discharge electrode 211 as viewed from one side of the center axis of discharge electrode 211.

Air blower 22 that is a part of internal components 2 is configured by, for example, a fan motor. That is, air blower 22 includes a fan and a motor mechanically connected to the fan. In air blower 22, the motor is rotated by power supply to the motor, and the fan is rotated. Accordingly, air blower 22 generates an air flow flowing along a rotation axis of the fan. That is, in the first exemplary embodiment, air blower 22 is disposed such that the rotation axis of the fan is parallel to the X-axis. Therefore, air blower 22 generates an air flow (wind) flowing in the positive direction of the X-axis from air supply port 32 toward discharge port 31 of case 3 along the X-axis.

Drive circuit 23 that is a part of internal components 2 includes circuit board 230 and various mounting components such as transformer 25. The mounting components such as transformer 25 are mounted on circuit board 230. In the first exemplary embodiment, not only the mounting components (such as transformer 25) constituting drive circuit 23 but also discharger 21, air blower 22, liquid supply unit 24, connector 27, and the like are mounted on circuit board 230. Connector 27 electrically connects drive circuit 23 to an external circuit. Here, the "mounting" means mechanical and electrical connection to circuit board 230. That is, the mounting components (such as transformer 25), discharger 21, air blower 22, liquid supply unit 24, and connector 27 are mechanically connected (joined) and electrically connected to circuit board 230 by a method such as soldering or connector connection. In the first exemplary embodiment, the mechanical connection of air blower 22 to circuit board 230 is achieved by, for example, snap-fitting in which a claw (hook) provided in air blower 22 is hooked on circuit board 230.

Drive circuit 23 is a circuit that drives discharger 21. That is, drive circuit 23 applies an application voltage between discharge electrode 211 and counter electrode 212 constituting discharger 21. As a result, drive circuit 23 generates discharge between the electrodes of discharger 21. Note that the "application voltage" stated in the present disclosure means the voltage that drive circuit 23 applies across discharge electrode 211 and counter electrode 212 to cause discharger 21 to discharge.

That is, drive circuit 23 receives power supply from, for example, an external power supply, and generates the voltage (application voltage) to be applied to discharger 21. Here, the "power supply" is a power supply that supplies power for operation to drive circuit 23 and the like. Specifically, the power supply generates a DC voltage of, for example, about several V to several tens of V, and inputs the generated voltage to drive circuit 23. Drive circuit 23 boosts an input voltage from the power supply by transformer 25, and outputs the boosted voltage to discharger 21 as an application voltage. That is, drive circuit 23 generates a high voltage (application voltage) for causing discharger 21 to discharge on a secondary side of transformer 25.

Here, drive circuit 23 includes a reference potential point electrically connected to metal body 30. In the first exemplary embodiment, the reference potential point corresponds to the ground of drive circuit 23. That is, metal body 30 of case 3 is electrically connected to the ground that is the reference potential point of drive circuit 23. As a result, a frame ground of drive circuit 23 is achieved.

Drive circuit 23 is electrically connected to discharger 21 (discharge electrode 211 and counter electrode 212). Specifically, connection terminal 252 (see FIG. 10) that is a secondary terminal of transformer 25 in drive circuit 23 is electrically connected to discharger 21 through harness 26. In drive circuit 23 of the first exemplary embodiment, a high voltage is applied between discharge electrode 211 and counter electrode 212 with discharge electrode 211 as a negative electrode (ground) and counter electrode 212 as a positive electrode.

That is, connection terminal 252 of transformer 25 is connected to counter electrode 212 of discharger 21, and the ground is connected to discharge electrode 211 as a reference potential point set on circuit board 230. As a result, drive circuit 23 applies a high voltage to discharger 21 such that discharge electrode 211 is on a low potential side and counter electrode 212 is on a high potential side. Here, the "high voltage" only needs to be a voltage set such that full-scale dielectric breakdown discharge or partial dielectric breakdown discharge described later occurs in discharger 21. The high voltage is, for example, a voltage having a peak of about 6.0 kV.

The full-scale dielectric breakdown discharge and the partial dielectric breakdown discharge will be described in detail in the section of "(2.3) Operation".

Liquid supply unit 24 that is a part of internal components 2 supplies liquid to discharge electrode 211 of discharger 21. Effective component generation device 1 electrostatically atomizes the liquid supplied from liquid supply unit 24 by the discharge generated in discharger 21.

Specifically, the liquid supplied from liquid supply unit 24 adheres to a surface of discharge electrode 211. Then, the application voltage is applied from drive circuit 23 to discharger 21 in a state where the liquid is held in discharge electrode 211. As a result, discharge is generated in discharger 21. In this configuration, the liquid held by discharge electrode 211 is electrostatically atomized by discharge energy generated in discharger 21. In the present disclosure, the liquid held in discharge electrode 211, that is, a liquid to be electrostatically atomized is also simply referred to as "liquid".

Liquid supply unit 24 supplies the liquid for electrostatic atomization to discharge electrode 211. Liquid supply unit 24 includes, for example, a Peltier element. The Peltier element cools discharge electrode 211 to generate dew condensation water on discharge electrode 211, and supplies liquid (dew condensation water) to discharge electrode 211. That is, liquid supply unit 24 cools discharge electrode 211 thermally coupled with the Peltier element by energization to the Peltier element from drive circuit 23. Accordingly, moisture in the air condenses and adheres to the surface of discharge electrode 211 as dew condensation water. That is, liquid supply unit 24 is configured to cool discharge electrode 211 and generate dew condensation water as liquid on the surface of discharge electrode 211. According to this configuration, liquid supply unit 24 supplies the liquid (dew condensation water) to discharge electrode 211 using the moisture in the air. This eliminates the need for additional components such as supplying and refilling liquid to effective component generation device 1.

(2.3) Operation

Effective component generation device 1 configured as described above causes discharge in discharger 21 (discharge electrode 211 and counter electrode 212) by operation of drive circuit 23 described below.

Here, drive circuit 23 includes two modes of a first mode and a second mode as operation modes. The first mode is a mode for increasing application voltage in accordance with an elapse of time to form a discharge path developed from a corona discharge and dielectrically broken at least partially between discharge electrode 211 and opposite electrode 212, to consequently generate a discharge current. The second mode is a mode for cutting off the discharge current by bringing discharger 21 into an overcurrent state. The "discharge current" in the present disclosure means a relatively large current flowing through the discharge path. Therefore, the discharge current does not include a minute current of about several μA generated in the corona discharge before the discharge path is formed. In addition, the "overcurrent state" of the present disclosure means a state in which a current equal to or larger than an assumed value flows through discharger 21 due to discharge.

In effective component generation device 1 according to the first exemplary embodiment, drive circuit 23 operates to alternately repeat the first mode and the second mode during a drive period. That is, drive circuit 23 switches between the first mode and the second mode at a drive frequency at which a magnitude of the application voltage applied to discharger 21 is periodically varied. The "drive period" of the present disclosure is a period during which drive circuit 23 that causes discharger 21 to discharge operates.

That is, drive circuit 23 does not keep the magnitude of the voltage applied to discharger 21 including discharge electrode 211 at a fixed value, but periodically changes the voltage at a drive frequency within a predetermined range. As a result, drive circuit 23 intermittently causes discharger 21 to discharge. That is, the discharge path is periodically formed in accordance with a change cycle of the application voltage, and the discharge is periodically generated. In the following description, a cycle at which discharge (full-scale dielectric breakdown discharge or partial dielectric breakdown discharge) occurs is referred to as a "discharge cycle", in some cases.

By the operation of drive circuit 23 described above, the magnitude of the electric energy acting on the liquid held by discharge electrode 211 periodically fluctuates according to the drive frequency. As a result, the liquid held by discharge electrode 211 mechanically vibrates according to the fluctuation of the drive frequency.

That is, drive circuit 23 applies a voltage to discharger 21 including discharge electrode 211. As a result, a force due to the electric field acts on the liquid held by discharge electrode 211, and the liquid is deformed.

In the first exemplary embodiment, in discharger 21, voltage is applied between counter electrode 212 and discharge electrode 211 facing each other. Therefore, a force in a direction of being pulled toward counter electrode 212 by an electric field acts on the liquid. As a result, the liquid held by discharge electrode 211 of discharger 21 extends toward counter electrode 212 along the center axis of discharge electrode 211 (along the X-axis) to form a conical shape called a Taylor cone. Then, when the voltage applied to discharger 21 decreases, the force acting on the liquid due to the influence of the electric field also decreases, and thus the liquid is deformed from the state of the Taylor cone. As a result, the liquid held by discharger 21 of discharge electrode 211 contracts.

That is, when the magnitude of the voltage applied to discharger 21 periodically varies depending on the drive frequency, the liquid held by discharge electrode 211 expands and contracts along the center axis of discharge electrode 211 (along the X-axis). Accordingly, an electric field is concentrated on a distal end (apex portion) of the Taylor cone, which leads development of discharge. Therefore, dielectric breakdown of air occurs in a state where the distal end of the Taylor cone is pointed. In synchronization with the drive frequency, therefore, discharge (full-scale dielectric breakdown discharge or partial dielectric breakdown discharge) occurs intermittently.

That is, the liquid held by discharge electrode 211 is subjected to a force of the electric field to form the Taylor cone. As a result, the electric field tends to concentrate between the distal end (vertex) of the Tailor cone and counter electrode 212. This generates relatively high-energy discharge between the liquid and counter electrode 212. Then, the corona discharge generated in the liquid held by discharge electrode 211 is developed to higher energy discharge. As a result, at at least a part between discharge electrode 211 and counter electrode 212, a discharge path in a state of dielectric breakdown can be formed intermittently.

Then, the liquid held by discharge electrode 211 is electrostatically atomized by the high-energy discharge. As a result, in effective component generation device 1 of the first exemplary embodiment, a nanometer-sized charged fine particle liquid containing OH radicals is generated. That is, the charged fine microparticle liquid as an effective component is generated in discharger 21. The generated charged fine particle liquid is discharged to the outside of case 3 through discharge port 31 of metal body 30 of case 3.

As described above, effective component generation device 1 of the first exemplary embodiment operates to release the generated charged fine particle liquid to the outside.

Next, the full-scale dielectric breakdown discharge and the partial breakdown discharge in the above-described discharge state will be described.

The full-scale dielectric breakdown discharge is a discharge state in which the corona discharge progresses to the full-scale dielectric breakdown between the pair of electrodes (discharge electrode 211 and counter electrode 212). That is, in the full-scale dielectric breakdown discharge, a discharge path entirely and dielectrically broken is formed between discharge electrode 211 and counter electrode 212.

The "dielectric breakdown" described in the present disclosure means that electrical insulation of an insulator (including gases such as air) separating conductors is broken, and the insulating state cannot be maintained. Specifically, in a case of dielectric breakdown of a gas, for example, ionized molecules are accelerated by an electric field and collide with other gas molecules, and ionize the other gas molecules. Then, the ion concentration suddenly increases to cause gas discharge, so that dielectric breakdown occurs.

On the other hand, the partial dielectric breakdown discharge is a discharge state in which a discharge path is formed by partial dielectric breakdown between the pair of electrodes (discharge electrode 211 and counter electrode 212) developed from the corona discharge. That is, in the partial dielectric breakdown discharge, a discharge path partially and dielectrically broken is formed between discharge electrode 211 and counter electrode 212. That is, a discharge path dielectrically broken is formed between discharge electrode 211 and counter electrode 212 not entirely but partially (locally). Thus, in the partial dielectric breakdown discharge, the discharge path formed between discharge electrode 211 and counter electrode 212 does not reach entire dielectric breakdown, but has partial dielectric breakdown.

However, in effective component generation device 1 according to the first exemplary embodiment, regardless of whether the discharge state is the full-scale dielectric breakdown discharge or the partial dielectric breakdown discharge, the dielectric breakdown between the pair of electrodes (discharge electrode 211 and counter electrode 212) is not continuously generated, but is intermittently generated. Therefore, a discharge current generated between the pair of electrodes (discharge electrode 211 and counter electrode 212) is also intermittently generated.

At this time, in a case where the power supply (drive circuit 23) does not have a current capacity required to maintain the discharge path, the voltage applied between the pair of electrodes decreases as soon as the corona discharge develops into the dielectric breakdown. Therefore, the discharge path is interrupted, and the discharge is stopped. Note that the "current capacity" indicates a capacity of current that can be released by the power supply in a unit time.

Then, the discharge current intermittently flows by repetition of generation and stop of the discharge. That is, the discharge state of effective component generation device 1 according to the first exemplary embodiment repeats a state where the discharge energy is high and a state where the discharge energy is low. In this respect, the discharge state of effective component generation device 1 is different from glow discharge and arc discharge in that the dielectric breakdown is continuously generated (discharge current is continuously generated).

As a result, effective component generation device 1 generates an effective component such as radicals with larger discharge energy in the full-scale dielectric breakdown discharge or the partial dielectric breakdown discharge than that in the corona discharge. Specifically, effective component generation device 1 according to the first exemplary embodiment generates a large amount of effective components which is about 2 to 10 times as large as that of the corona discharge. The effective components thus generated constitute a basis for exerting useful effects in various situations including sterile filtration, odor removal, moisture keeping, freshness keeping, and virus inactivation.

In addition, in the partial dielectric breakdown discharge, dissipation of an effective component due to excessive discharge energy can be suppressed as compared with that of the full-scale dielectric breakdown discharge. Therefore, the partial dielectric breakdown discharge can improve the generation efficiency of the effective component as compared with that of the full-scale dielectric breakdown discharge. That is, in the full-scale dielectric breakdown discharge, since discharge energy related to the discharge is too high, a part of the generated effective component dissipates. Therefore, in the full-scale dielectric breakdown discharge, there is a possibility that the generation efficiency of the effective component decreases.

On the other hand, in the partial breakdown discharge, the discharge energy related to the discharge is suppressed to be small as compared with that of the full-scale dielectric breakdown discharge. Therefore, in the partial dielectric breakdown discharge, it is possible to reduce the amount of effective component dissipated due to exposure to excessive discharge energy, and to improve the generation efficiency of the effective component.

Furthermore, in the partial dielectric breakdown discharge, concentration of an electric field is reduced as compared with that of the full-scale breakdown discharge.

That is, in the full-scale dielectric breakdown discharge, a large discharge current momentarily flows between discharge electrode 211 and counter electrode 212 through a discharge path completely broken. Therefore, electric resistance at the time of the full-scale dielectric breakdown discharge becomes very small.

That is, in the partial dielectric breakdown discharge, a maximum value of the current instantaneously flowing between discharge electrode 211 and counter electrode 212 at the time of forming the discharge path partially dielectric broken down is suppressed to be smaller than that in the full-scale dielectric breakdown discharge. As a result, in the partial breakdown discharge, generation of nitride oxide (NOx) is suppressed as compared with that of the full-scale dielectric breakdown discharge. Further, in the partial breakdown discharge, generation of the electromagnetic noise is also suppressed.

(2.4) Detailed Configuration of Case

Figure 1B:
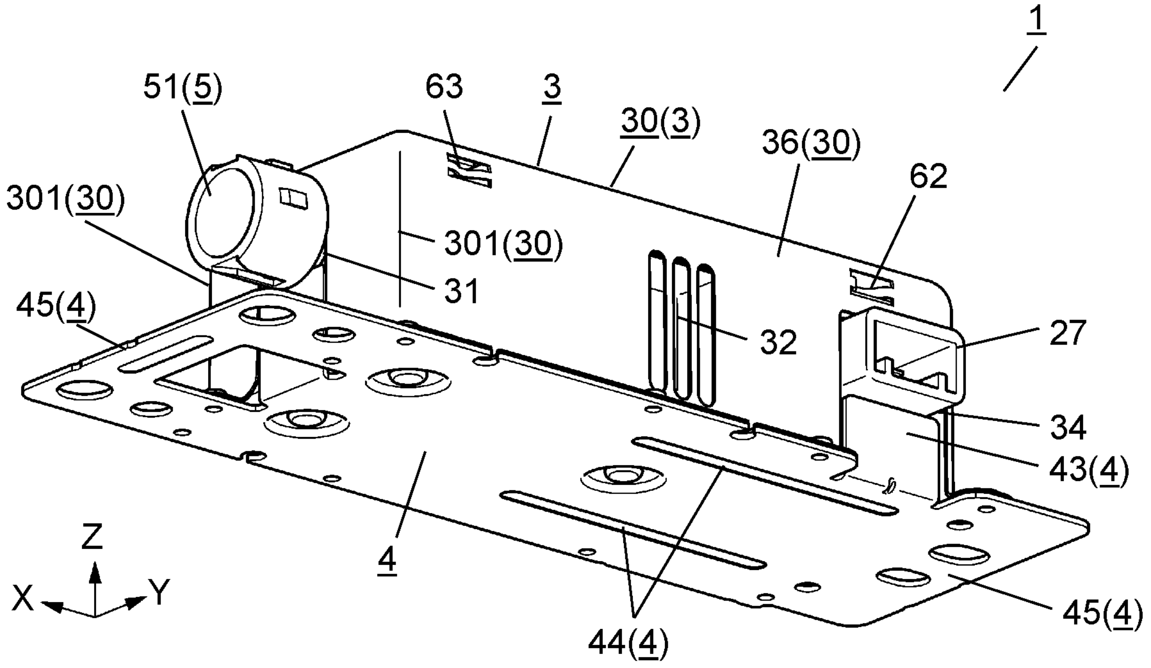
FIG. 1B is a perspective view of the effective component generation device as viewed from another direction.

Next, a more detailed configuration of case 3 will be described with reference to FIGS. 1A, 1B, and 4.

Case 3 is formed in a box-shaped rectangular parallelepiped shape having a dimension in the Y-axis direction smaller than a dimension in the X-axis direction and a dimension in the Z-axis direction smaller than a dimension in the Y-axis direction. Therefore, case 3 has a rectangular shape with the X-axis direction as the longitudinal direction and the Y-axis direction as the lateral direction in plan view (as viewed from the positive direction of the Z-axis).

Case 3 has an opening 33 that opens to a surface (peripheral wall 36) facing a negative direction of the Z-axis. In addition, case 3 has discharge port 31 formed on a surface (peripheral wall 36) facing the positive direction of the X-axis.

Further, case 3 has air supply port 32 and connector port 34 formed on a surface (peripheral wall 36) facing a positive direction of the Y-axis. Connector port 34 constitutes an opening for exposing connector 27 mounted on circuit board 230 to the outside of case 3. For example, an external circuit or the like is electrically connected to connector 27 exposed from connector port 34. Thus, drive circuit 23 is electrically connected to the external circuit via connector 27.

In the first exemplary embodiment, case 3 includes bottom plate 35, peripheral walls 36, flange 37, and the like. Peripheral walls 36 are provided so as to protrude from the outer peripheral edges of bottom plate 35 toward the negative direction of the Z-axis. Of bottom plate 35, a surface facing the positive direction of the Z-axis, that is, a surface surrounded by distal ends of peripheral walls 36 (a side of bottom plate 35) is bottom surface 310 of case 3 (see FIG. 4). Flange 37 is provided so as to protrude outward (in the X-axis and Y-axis directions) from the distal ends (a side of opening 33) of peripheral walls 36. Case 3 is joined to lid body 4 via flange 37.

The joining structure of case 3 and lid body 4 will be described in detail in the section of "(2.5) Joint structure of case and lid body".

Case 3 of the first exemplary embodiment includes metal body 30. That is, as described above, since case 3 is formed of a metal sheet, entire case 3 constitutes metal body 30. Metal body 30 has seamless portion 301 at a corner portion between two surfaces of adjacent peripheral walls 36 oriented in different directions (the X-axis direction and the Y-axis direction). Seamless portion 301 fills at least a part of the gap between the two surfaces of adjacent peripheral walls 36 at the corner portion.

In the first exemplary embodiment, metal body 30 corresponding to case 3 has a seamless structure. That is, in effective component generation device 1 of the first exemplary embodiment, internal components 2 including discharger 21 and drive circuit 23 is surrounded by metal body 30 of case 3. Therefore, metal body 30 functions as a shield against the electromagnetic noise generated in discharger 21, drive circuit 23, and the like.

When metal body 30 has a seamless structure, it is easy to suppress leakage of the electromagnetic noise to the outside of case 3. As a result, for example, at a time of occurrence of discharge in discharger 21, an influence of leakage of electromagnetic noise on peripheral devices of effective component generation device 1 can be reduced.

In addition, when metal body 30 has a seamless structure, entry of electrical noise into the inside of case 3 is easily suppressed. As a result, internal components 2 is less likely to be affected by electromagnetic noise generated around effective component generation device 1. As a result, measures against both electro magnetic interference (EMI) and electro magnetic susceptibility (EMS) can be implemented by metal body 30 of case 3. That is, the electromagnetic compatibility (EMC) measures can be implemented by metal body 30.

Furthermore, when metal body 30 has a seamless structure, electromagnetic noise in a frequency band of 50 kHz or more and 200 kHz or less can be reduced. More specifically, the present discloser and the like have confirmed that electromagnetic noise in a frequency band of 100 kHz or more and 160 kHz or less can be particularly reduced.

Specifically, metal body 30 corresponding to case 3 is formed in a box shape by drawing (rectangular cylindrical drawing) of a metal sheet. Therefore, in case 3 thus formed, not only corner portions between bottom plate 35 and peripheral walls 36, but also four corner portions of peripheral walls 36 positioned at four corners in plan view do not have joints. In other words, in the first exemplary embodiment, at least a gap at a corner portion between two adjacent surfaces of peripheral walls 36 oriented in different directions from each other is completely filled by seamless portion 301. For example, a gap at a corner portion between a surface of peripheral wall 36 facing the positive direction of the X-axis and a surface facing the positive direction of the Y-axis is filled with seamless portion 301. That is, peripheral walls 36 surrounding bottom surface 310 of case 3 are formed of one metal sheet continuously without a seam in a circumferential direction of bottom surface 310.

In general, in a case of forming a case in a box shape by bending a metal sheet, a gap is inevitably generated at a joint or the like of the bent metal sheet. On the other hand, case 3 of effective component generation device 1 of the first exemplary embodiment is formed by drawing a metal sheet. Therefore, the gap is filled with seamless portion 301. That is, as compared with a box-shaped case formed by bending a metal sheet, case 3 of the first exemplary embodiment can eliminate or reduce a gap generated at a corner portion between two surfaces of adjacent peripheral walls 36 oriented in different directions of metal body 30.

Metal body 30 of case 3 of the first exemplary embodiment further includes fixing portion 61. Fixing portion 61 is a portion for fixing internal components 2 to bottom surface 310 of bottom plate 35 of case 3. Since fixing portion 61 is formed integrally with metal body 30, the fixing portion is provided continuously with metal body 30 without a seam. Specifically, for internal components 2, circuit board 230 is fixed to fixing portion 61 by screw 71 and nut 72. As a result, internal components 2 are fixed to bottom surface 310 of case 3. That is, case 3 has fixing portion 61 that fixes circuit board 230 to bottom surface 310 of case 3.

Details will be described in the section of "(2.6) Fixing structure of internal component".

Fixing portion 61 is formed of a cylindrical portion protruding from bottom surface 310 of bottom plate 35 of metal body 30 of case 3 toward lid body 4. Fixing portion 61 is disposed at a central portion of bottom surface 310 of case 3. In the first exemplary embodiment, cylindrical fixing portion 61 is formed integrally with bottom plate 35 of metal body 30 by drawing (cylindrical drawing) bottom plate 35 of case 3. Therefore, formed fixing portion 61 does not form a seam with bottom plate 35. That is, no gap is generated between the fixing portion 61 and the bottom plate 35 over the entire circumference of the fixing portion 61. With such a configuration, bottom plate 35 that is a part of metal body 30 and fixing portion 61 are formed of one metal sheet continuously formed without a seam.

Case 3 further includes support portion 62. Support portion 62 has a function of supporting circuit board 230 included in drive circuit 23. Support portion 62 is formed integrally with one of peripheral walls 36 of case 3. In the first exemplary embodiment, a pair of support portions 62 is provided on a pair of inner side surfaces of peripheral walls 36 facing each other in the Y-axis direction. The pair of support portions 62 is formed so as to protrude in directions approaching each other from portions of the pair of inner side surfaces facing each other.

Case 3 further includes restriction portion 63. Restriction portion 63 is disposed at a position between bottom surface 310 of bottom plate 35 of metal body 30 of case 3 and circuit board 230. Restriction portion 63 has a function of restricting movement of circuit board 230 in a direction approaching bottom surface 310. Restriction portion 63 is formed integrally with one of peripheral walls 36 of case 3. In the first exemplary embodiment, a pair of restriction portions 63 is provided on a pair of inner side surfaces of peripheral walls 36 facing each other in the Y-axis direction. The pair of restriction portions 63 is formed so as to protrude from portions of the pair of inner side surfaces facing each other in directions approaching each other.

That is, in the first exemplary embodiment, each of support portions 62 and restriction portions 63 is formed of a cut-and-bent portion of a metal sheet constituting metal body 30 of case 3. Specifically, first, two slits (lances) parallel to the X-axis are formed in parts of peripheral walls 36. Then, the portions between the two slits are bent and raised so as to protrude toward the inside of case 3. Thus, support portions 62 or restriction portions 63 are formed.

Fixing portion 61, support portion 62, and restriction portion 63 will be described in detail in the section of "(2.6) Fixing structure of internal components".

(2.5) Joint Structure of Case and Lid Body

Figure 6:
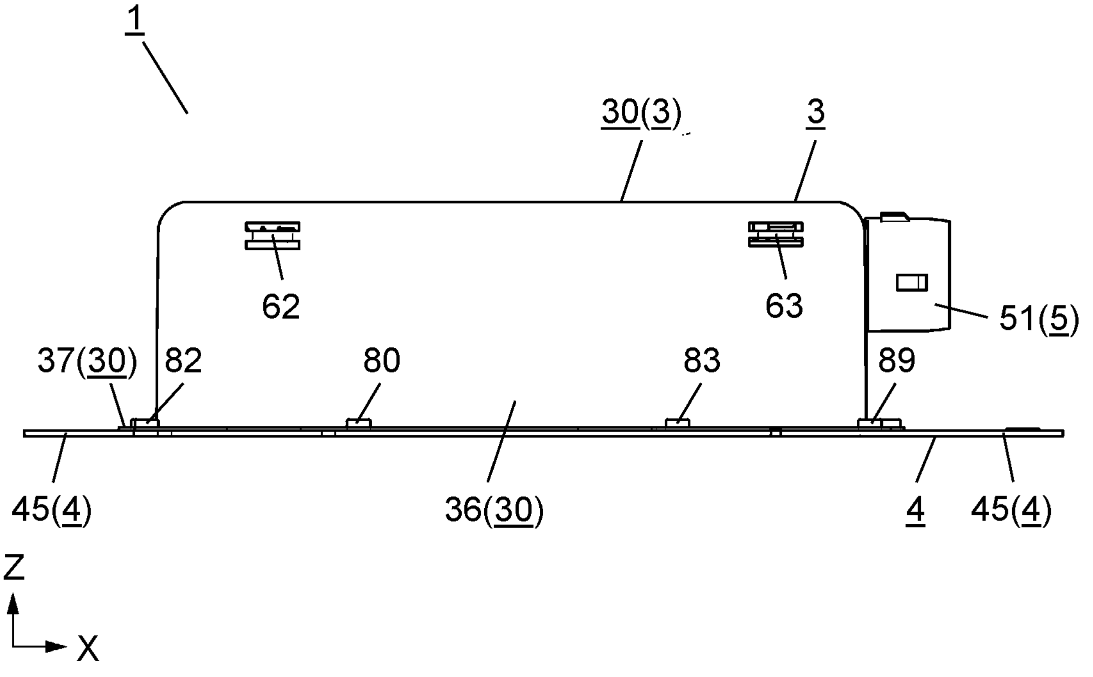
FIG. 6 is a side view of the effective component generation device.

Next, a joint structure between case 3 and lid body 4 will be described in detail with reference to FIGS. 6 and 7.

As described above, lid body 4 is joined to case 3 so as to close opening 33 in a state where internal components 2 are housed between lid body 4 and case 3. In the first exemplary embodiment, case 3 and lid body 4 are joined via flange 37 protruding outward from the distal ends of peripheral walls 36 of case 3. That is, in plan view, case 3 and lid body 4 are joined to each other at a plurality of joints located in flange 37 around opening 33. In the first exemplary embodiment, two metal sheets (flange 37 of case 3 and lid body 4) overlapped with each other in the Z-axis direction are joined by caulking via a plurality of joints, for example, by dowel caulking or the like in a state of being brought into close contact with each other. That is, each of the plurality of joints constitutes a caulked joint. Accordingly, a gap between case 3 and lid body 4 can be reduced. As a result, electromagnetic noise leaking from the gap can be more effectively reduced.

Specifically, the plurality of joints are disposed in flange 37 of case 3 so as to be aligned in the circumferential direction along the outer peripheral edge of bottom plate 35 in plan view. The plurality of joints are disposed on four sides of flange 37 so as to surround bottom plate 35 of case 3 from four sides. In the first exemplary embodiment, as an example, 10 joints 80 to 89 including first joint 81, second joint 82, third joint 83, and fourth joint 84 are provided. Note that a plurality of joints will be simply referred to as "joints" except for individually describing the joints.

Figure 7:
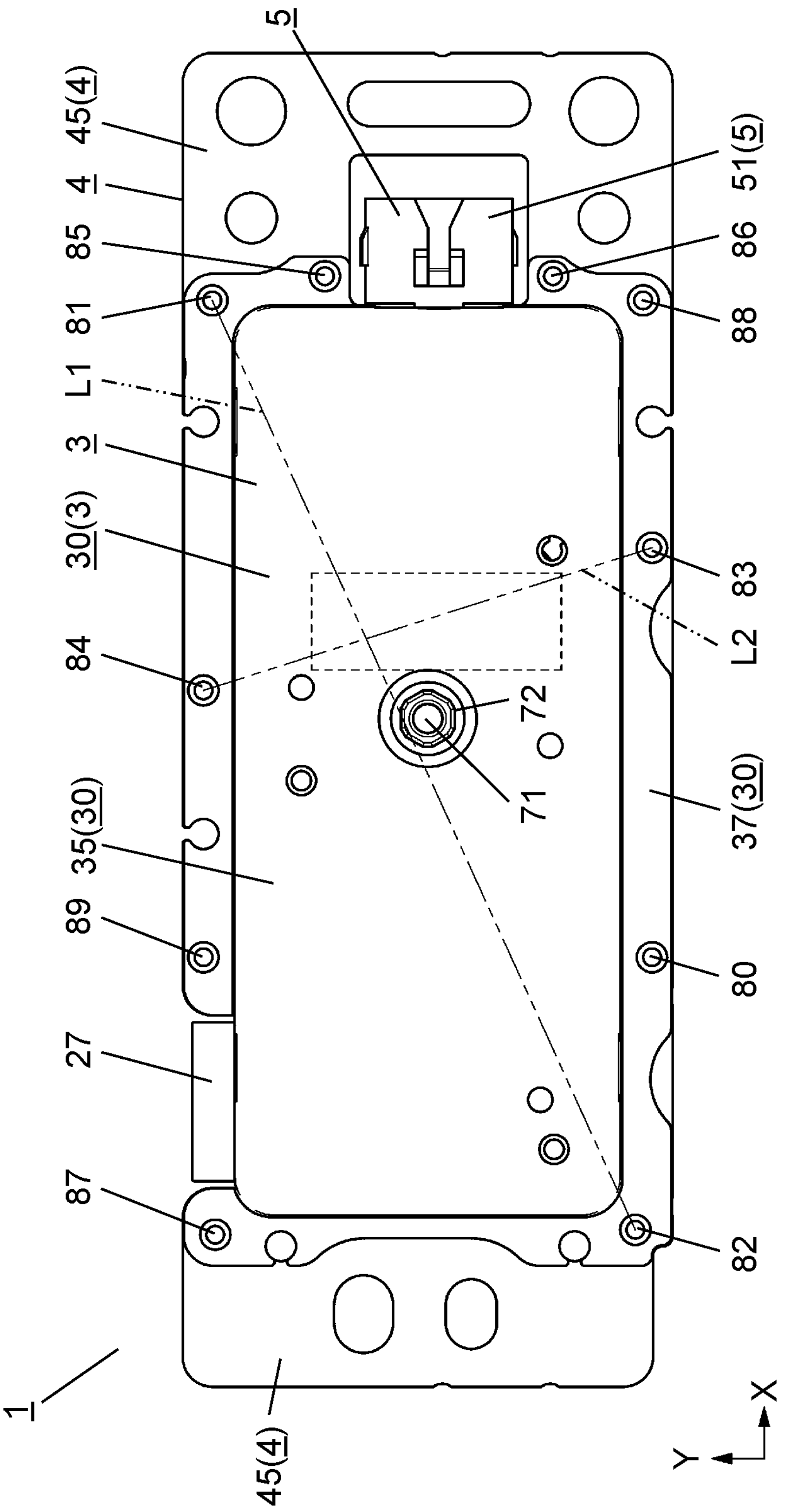
FIG. 7 is a plan view of the effective component generation device.

As illustrated in FIG. 7, each of first joint 81 and second joint 82 is disposed at a corner portion of opening 33 of metal body 30 as well as a position of flange 37 on a diagonal line of opening 33 in plan view. Third joint 83 and fourth joint 84 are disposed on flange 37 on both sides in the Y-axis direction as well as at positions not facing opening 33 of metal body 30 in the X-axis direction.

Fifth joint 85 and sixth joint 86 are disposed on both sides of flange 37 in the Y-axis direction with respect to nozzle 51 in plan view. Each of seventh joint 87 and eighth joint 88 is disposed at a corner portion of opening 33 of metal body 30 as well as at a position of flange 37 on a diagonal line of opening 33 in plan view. Seventh joint 87 and eighth joint 88 are disposed to face first joint 81 and second joint 82, respectively, in the Y-axis direction. Ninth joint 89 and tenth joint 80 are disposed on both sides in the Y-axis direction so as to face opening 33 of metal body 30.

The plurality of joints 80 to 89 of the first exemplary embodiment include corner joints disposed at flange 37 at the corner portions of opening 33. That is, among ten joints 80 to 89, four of first joint 81, second joint 82, seventh joint 87, and eighth joint 88 constitute a corner joint. That is, the four corner joints (first joint 81, second joint 82, seventh joint 87, and eighth joint 88) are disposed at the four corner positions of flange 37. As a result, even when the four corners of flange 37 are caught in a manufacturing step, an assembling step, or the like of effective component generation device 1, the corner joints prevent flange 37 from curling. As a result, it is possible to prevent a gap between case 3 and lid body 4 from being widened due to curling.

Here, as illustrated in FIG. 7, first straight line L1 connecting first joint 81 and second joint 82 and second straight line L2 connecting third joint 83 and fourth joint 84 are assumed. First straight line L1 and second straight line L2 are both virtual lines and are not substantive. First straight line L1 and second straight line L2 intersect each other in opening 33 of case 3 in plan view.

That is, in the first exemplary embodiment, case 3 and lid body 4 are joined to each other via the plurality of joints 80 to 89 formed at positions of flange 37 around opening 33 and including first joint 81, second joint 82, third joint 83, and fourth joint 84. First straight line L1 connecting first joint 81 and second joint 82 and second straight line L2 connecting third joint 83 and fourth joint 84 intersect each other in opening 33.

Furthermore, first straight line L1 and second straight line L2 pass over buffer 41 in plan view. More specifically, an intersection of first straight line L1 and second straight line L2 is located on buffer 41 when viewed from one side (the positive direction of the Z-axis) of the joining direction between case 3 and lid body 4 in plan view. That is, the positional relationship among buffer 41, and first joint 81, second joint 82, third joint 83, and fourth joint 84 is set so as to satisfy the above conditions.

Therefore, buffer 41 is compressed by being sandwiched between lid body 4 and a part of internal components 2 (air blower 22) in a state where lid body 4 is joined to case 3. Then, internal components 2 are pressed against bottom surface 310 of case 3 by the elastic force of buffer 41. Accordingly, at the time of joining case 3 and lid body 4, lid body 4 receives a reaction force from buffer 41.

At this time, a gap may be generated between the peripheral edge (flange 37) of opening 33 of case 3 and lid body 4 by the reaction force from buffer 41. Therefore, in the first exemplary embodiment, the positional relationship among buffer 41 and first joint 81, second joint 82, third joint 83, and fourth joint 84 is determined as described above. With such a configuration, a portion of lid body 4 that is brought into contact with buffer 41 can be reliably pressed.

That is, in lid body 4, two tensions act on buffer 41. One of the tensions is a tension generated when lid body 4 is joined to case 3 via first joint 81 and second joint 82. The other tension is tension generated by joining lid body 4 to case 3 via third joint 83 and fourth joint 84. As a result, the reaction force received from buffer 41 by lid body 4 is suppressed, and floating of lid body 4 due to the reaction force, or deformation of lid body 4 due to the reaction force is suppressed. As a result, a gap is hardly generated between the peripheral edge (flange 37) of opening 33 of case 3 and lid body 4.

(2.6) Fixing Structure of Internal Components

Next, details of a fixing structure of internal components 2 to case 3 will be described with reference to FIGS. 8A to 10.

In the first exemplary embodiment, as described above, fixing portion 61, support portions 62, and restriction portions 63 are formed in case 3.

Figures 8A, 8B, 8C:
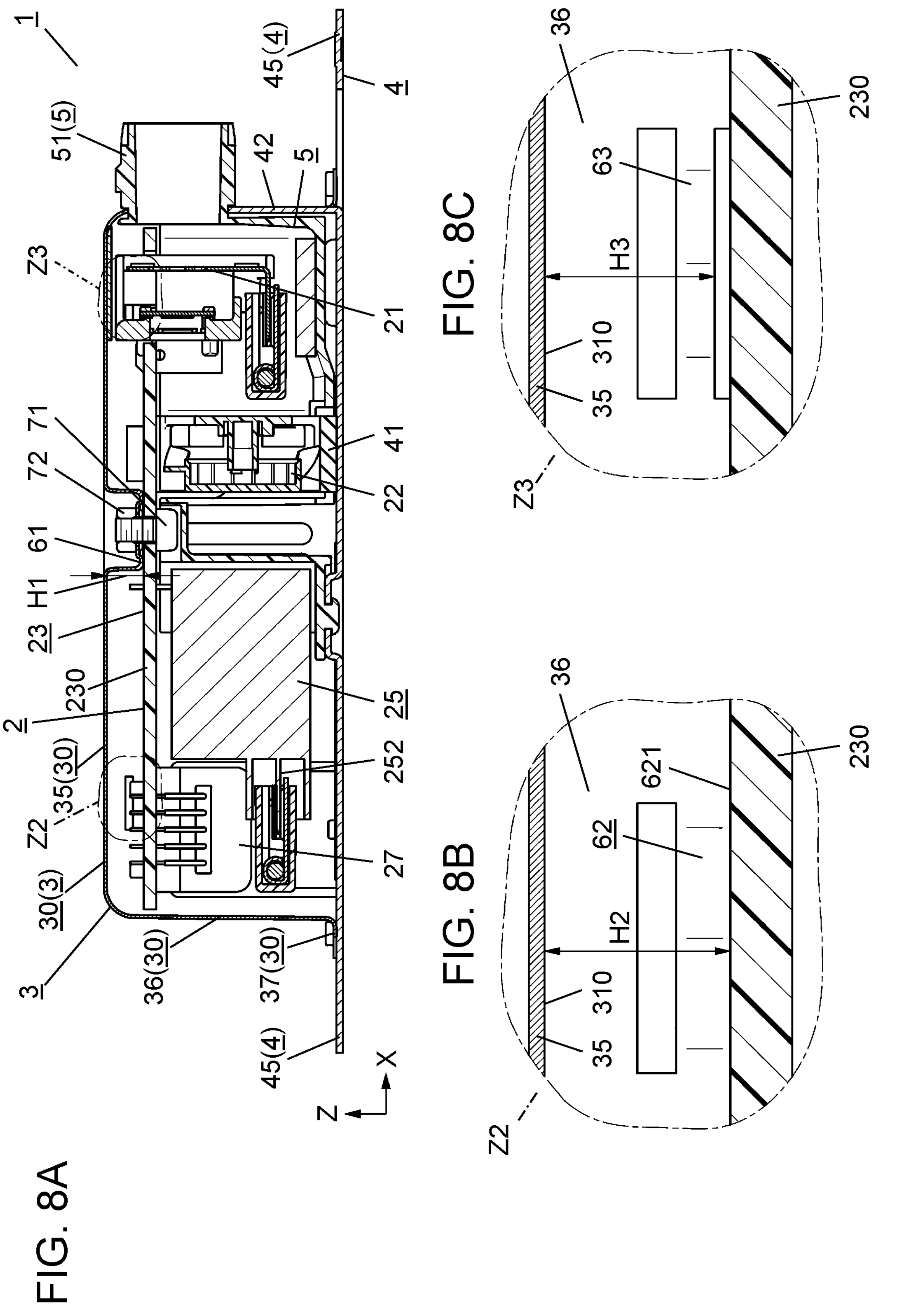
FIG. 8A is a cross-sectional view of the effective component generation device.
FIG. 8B is a schematic view illustrating a configuration of a support portion in region Z2 in FIG. 8A.
FIG. 8C is a schematic view illustrating a configuration of a restriction portion in region Z3 in FIG. 8A.

As illustrated in FIG. 8A, in internal components 2, circuit board 230 is fixed to fixing portion 61 by screw 71 and nut 72. As a result, circuit board 230 is fixed to bottom surface 310 of bottom plate 35 of metal body 30 of case 3.

Fixing portion 61 is formed integrally with bottom plate 35 of case 3 by drawing (cylindrical drawing) so as to protrude from bottom surface 310 of case 3 toward lid body 4 (in the negative direction of the Z-axis). In internal components 2, a central portion of circuit board 230 is fixed to fixing portion 61. Thus, circuit board 230 is fixed to case 3.

As illustrated in FIG. 8B, support portion 62 is in contact with circuit board 230 from one side (positive direction of the Z-axis) in a thickness direction of circuit board 230. Thus, support portion 62 supports circuit board 230. Support portion 62 is provided at a position between bottom surface 310 of case 3 and circuit board 230 in the Z-axis direction. That is, support portion 62 supports circuit board 230 by coming into contact with the opposing surface of circuit board 230 facing bottom surface 310 of case 3.

Support portion 62 includes connecting portion 621 and is formed integrally with metal body 30. Connecting portion 621 is electrically connected to the reference potential point (ground) by being in contact with circuit board 230. Specifically, circuit board 230 has conductive pad 231 (see FIG. 9) serving as a reference potential point on a part of an opposing surface facing bottom surface 310 of case 3. Conductive pad 231 is formed by, for example, solder. Connecting portion 621 of support portion 62 is in contact with conductive pad 231 of circuit board 230. As a result, the reference potential point of drive circuit 23 and connecting portion 621 are electrically connected. Further, conductive pad 231 of the first exemplary embodiment also protects and reinforces a contact portion of circuit board 230 with support portions 62.

In the first exemplary embodiment, fixing portion 61 is also formed integrally with metal body 30 similarly to support portions 62. Fixing portion 61 is also electrically connected to the reference potential point (ground) by contact with circuit board 230. That is, since circuit board 230 is fixed to fixing portion 61 by screw 71 and nut 72, the circuit board is brought into contact with not only support portions 62 and connecting portion 621 but also fixing portion 61. Therefore, conductive pad 231 serving as the reference potential point is formed not only at a portion in contact with support portions 62 and connecting portion 621 but also at a portion in contact with fixing portion 61 in the opposing surface facing bottom surface 310 of case 3 of circuit board 230. That is, fixing portion 61 is electrically connected to the reference potential point of drive circuit 23 by contact with conductive pad 231. Further, conductive pad 231 also protects and reinforces a contact portion of circuit board 230 with fixing portion 61.

Figure 9:
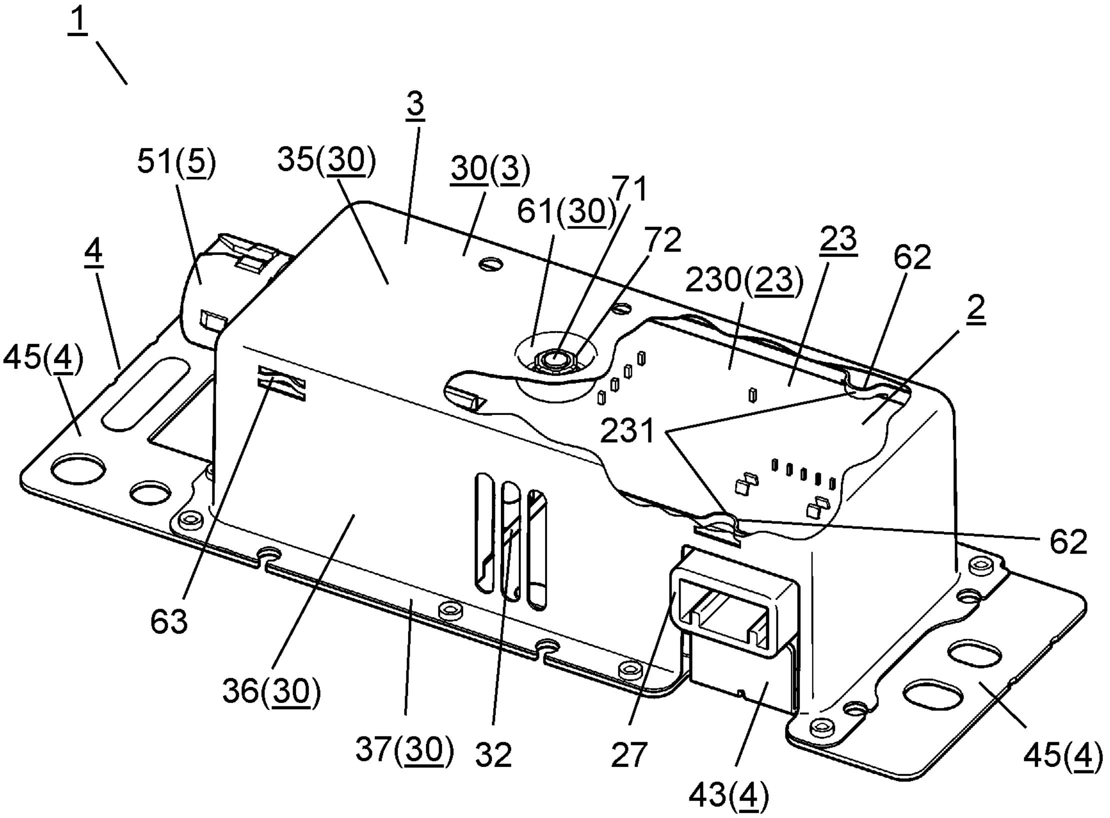
FIG. 9 is a perspective view illustrating the effective component generation device in a partially broken state.

The pair of support portions 62 is provided on peripheral walls 36 facing each other, of case 3 in the Y-axis direction. Therefore, as illustrated in FIG. 9, circuit board 230 is supported by bottom surface 310 of bottom plate 35 of case 3 at three points of one fixing portion 61 and the pair of support portions 62. Metal body 30 included in case 3 is electrically connected to the reference potential point (ground) of drive circuit 23 at three points of one fixing portion 61 and the pair of support portions 62. In particular, in the first exemplary embodiment, conductive pad 231 with which at least one support portion 62 is in contact is disposed in a vicinity of the power supply portion (connector 27) of circuit board 230. Therefore, a potential of metal body 30 is easily stabilized. This makes it easy to suppress generation of the electromagnetic noise that is likely to occur due to potential fluctuation.

As illustrated in FIG. 8A, fixing portion 61 is formed at a position where a height (the negative direction of the Z-axis) from bottom surface 310 of case 3 is lower than a position where connecting portion 621 is formed. That is, height H1 (see FIG. 8A) of fixing portion 61 from bottom surface 310 of case 3 is set slightly lower than height H2 (see FIG. 8B) of connecting portion 621 from bottom surface 310 of case 3 (H1<H2). Due to the above dimensional relationship, circuit board 230 easily comes into contact with connecting portion 621 with an appropriate contact pressure in a state where circuit board 230 is fixed to fixing portion 61.

As illustrated in FIG. 8C, restriction portions 63 are disposed between bottom surface 310 of case 3 and circuit board 230 in the Z-axis direction. However, unlike support portions 62, restriction portions 63 are disposed with a gap from circuit board 230. Therefore, restriction portions 63 are basically not in contact with circuit board 230. However, when warpage or the like occurs in circuit board 230, for example, restriction portions 63 come into contact with circuit board 230 from one side (the positive direction of the Z-axis) in the thickness direction of circuit board 230. As a result, further movement (warpage) of circuit board 230 in a direction approaching bottom surface 310 of metal body 30 is restricted. That is, when warpage or the like occurs in circuit board 230, restriction portions 63 come into contact with the opposing surface of circuit board 230 facing bottom surface 310 of case 3 to restrict the movement of circuit board 230. In the first exemplary embodiment, similarly to support portions 62, restriction portions 63 are also formed integrally with metal body 30 constituting case 3.

Here, restriction portions 63 each are formed at a position where a height (the negative direction of the Z-axis) from bottom surface 310 of case 3 is lower than a forming position of fixing portion 61. That is, height H3 (see FIG. 8C) of restriction portion 63 from bottom surface 310 of case 3 is set slightly lower than height H1 (see FIG. 8A) of fixing portion 61 from bottom surface 310 of case 3 (H3<H1). Due to the above dimensional relationship, a gap is secured between each of restriction portions 63 and circuit board 230 in a normal state where no warpage or the like occurs in circuit board 230.

Figure 10:
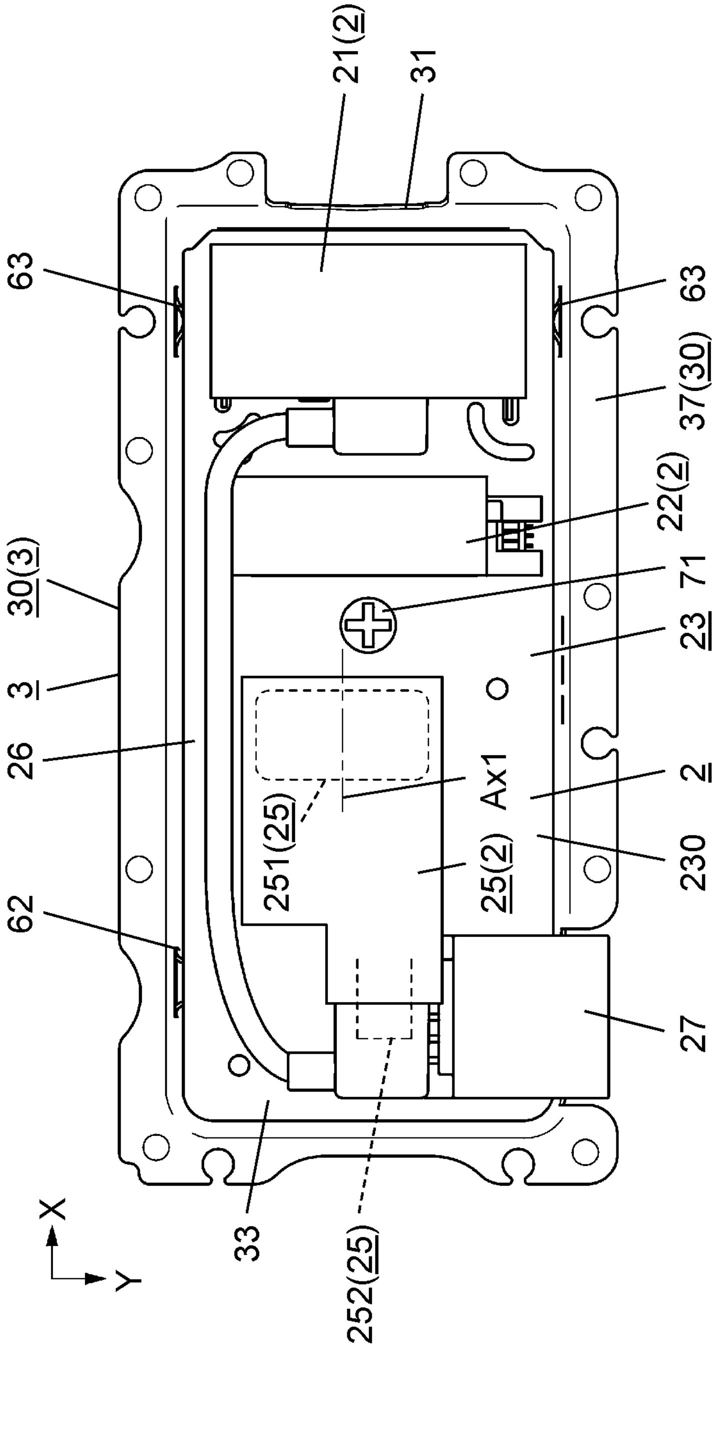
FIG. 10 is a plan view illustrating the case and internal components of the effective component generation device.
Figure 11A:
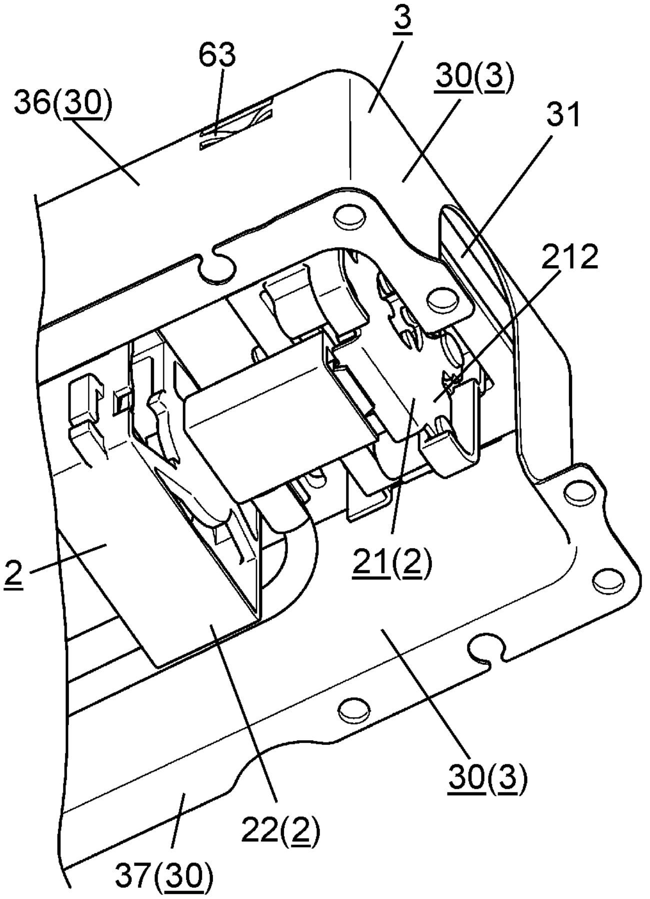
FIG. 11A is a perspective view of a case side of an effective component generation device according to a second exemplary embodiment.
Figure 11B:
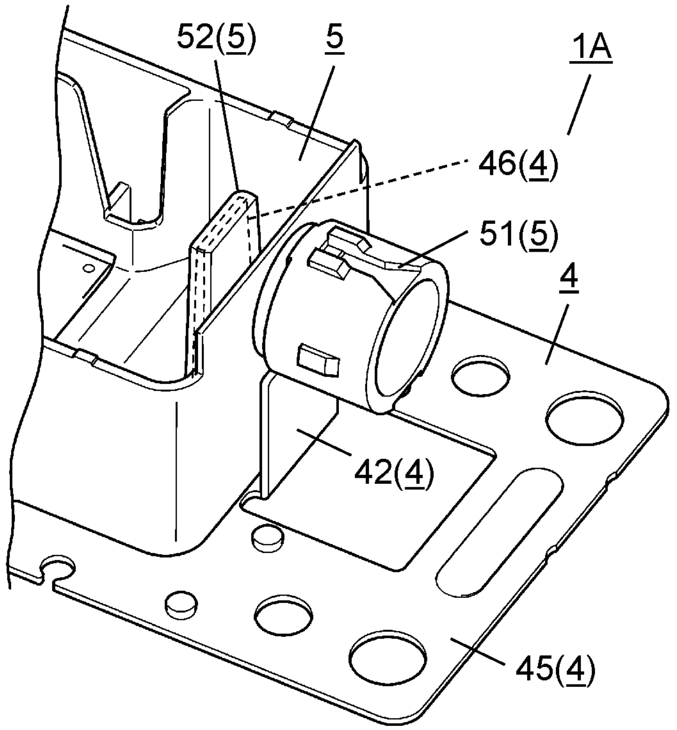
FIG. 11B is a perspective view of the effective component generation device on a lid body side.

As illustrated in FIG. 10, transformer 25 included in drive circuit 23 includes coiled portion 251 and connection terminal 252 connected to discharger 21. Discharger 21 and connection terminal 252 are disposed at positions opposite to each other as viewed from coiled portion 251 in the X-axis direction.

Transformer 25 includes coiled portion 251 formed of a conductive wire wound around central axis Ax1 and connection terminal 252 as the secondary terminal. Central axis Ax1 of coiled portion 251 is along the X-axis.

Transformer 25 boosts the input voltage from the power supply by coiled portion 251. Transformer 25 then outputs the boosted voltage as an application voltage from connection terminal 252, which is the secondary terminal, to discharger 21. That is, connection terminal 252 is electrically connected to discharger 21 via harness 26.

Further, transformer 25 is mounted on circuit board 230 in a direction in which discharger 21 and connection terminal 252 are located on opposite sides as viewed from coiled portion 251. Specifically, when viewed from coiled portion 251, discharger 21 is located in the positive direction of the X-axis, and connection terminal 252 is located in the negative direction of the X-axis. In other words, connection terminal 252, coiled portion 251, and discharger 21 are disposed in this order in the positive direction along the X-axis (central axis Ax1 of coiled portion 251). That is, coiled portion 251 is disposed between connection terminal 252 and discharger 21 in the positive direction along the X-axis (central axis Ax1 of coiled portion 251). Harness 26 is routed between transformer 25 and peripheral walls 36 of metal body 30 to connect connection terminal 252 and discharger 21.

As a result, coiled portion 251 of transformer 25 can be disposed in a vicinity of the central portion of circuit board 230. As a result, coiled portion 251 of transformer 25 is disposed away from peripheral walls 36 of case 3 by a certain distance or more. Here, coiled portion 251 may be a generation source of the electromagnetic noise at the time of boosting in drive circuit 23. However, by disposing coiled portion 251 away from peripheral wall 36 of case 3, leakage of the electromagnetic noise to the outside of case 3 (metal body 30) can be easily suppressed. In particular, in central axis Ax1 of coiled portion 251, connection terminal 252 is interposed between coiled portion 251 and peripheral walls 36 of case 3. Accordingly, a distance between coiled portion 251 and peripheral walls 36 of case 3 can be increased. As a result, leakage of the electromagnetic noise to the outside of case 3 (metal body 30) can be more easily suppressed.

Note that, in addition to coiled portion 251 of transformer 25, it is preferable to have a configuration in which, for example, a component such as an inductor that can be a main generation source of the electromagnetic noise is also disposed in the vicinity of the central portion of circuit board 230. That is, it is preferable that a component serving as a generation source of the electromagnetic noise is disposed in case 3 at a position away from peripheral walls 36 of case 3 by a certain distance or more.

(2.7) Manufacturing Method

Hereinafter, a method for manufacturing effective component generation device 1 described above will be described.

The method for manufacturing effective component generation device 1 basically includes each step of manufacturing internal components 2, case 3, and lid body 4, respectively, and a step of assembling them.

In the step of manufacturing internal components 2, first, circuit board 230 and the like are manufactured. This step is performed in a step of mounting components (such as transformer 25) constituting drive circuit 23, discharger 21, air blower 22, liquid supply unit 24, connector 27, and the like on circuit board 230.

In the step of manufacturing lid body 4, first, lid body 4 is prepared. This step is performed by fixing buffer 41 and air passage member 5 to lid body 4.

Further, a case manufacturing step of manufacturing case 3 is executed in a step of manufacturing box-shaped case 3 by performing drawing (rectangular cylindrical drawing) on the metal sheet. In the case manufacturing step, it is possible to manufacture case 3 having a seamless structure in which a joint is not formed not only at the corner portions between bottom plate 35 and peripheral walls 36 but also at the four corner portions of peripheral walls 36 positioned at the four corners in plan view.

In the step of assembling internal components 2, case 3, and lid body 4, first, a step of housing internal components 2 in case 3 and joining case 3 and lid body 4 is executed.

In the housing step of housing internal components 2 in case 3, first, internal components 2 configured by mounting discharger 21, air blower 22, and the like on circuit board 230 is housed in case 3. Next, a step of fixing circuit board 230 to fixing portion 61 with screw 71 and nut 72 is executed. As a result, internal components 2 are fixed to bottom surface 310 of bottom plate 35 of case 3.

That is, the method for manufacturing effective component generation device 1 according to the first exemplary embodiment includes the case manufacturing step and the housing step.

As described above, effective component generation device 1 includes internal components 2 and case 3. Internal components 2 include discharger 21 that generates an effective component. Case 3 is formed in a box shape having discharge port 31 through which an effective component is discharged, and houses internal components 2. The case manufacturing step is a step of forming case 3 by drawing a metal sheet. The housing step is a step of housing internal components 2 in case 3.

(3) Modifications

The first exemplary embodiment is merely one of various exemplary embodiments of the present disclosure. If the purpose of the present disclosure can be achieved, the first exemplary embodiment can be variously modified according to the design and the like. The drawings referred to in the present disclosure are all schematic views. Therefore, the ratio of the size and thickness of each component in the drawings does not necessarily reflect the actual dimension ratio. Hereinafter, modifications of the first exemplary embodiment will be listed. The modifications described below can be applied in appropriate combination.

That is, in the first exemplary embodiment, the application of effective component generation device 1 has been described by taking the in-vehicle application as an example, but the present invention is not limited thereto. Effective component generation device 1 may be used for, for example, a refrigerator, a washing machine, a dryer, an air conditioner, an electric fan, an air purifier, a humidifier, or a facial treatment device used in a house or an office.

In addition, in the first exemplary embodiment, an example has been described in which the seamless structure of metal body 30 is achieved by forming case 3 by drawing, but the present invention is not limited thereto. That is, effective component generation device 1 may have a configuration in which at least a part of the gap is closed by seamless portion 301 so as to reduce the gap between the two surfaces of adjacent peripheral walls 36 at the corner portion of metal body 30. For example, at the corner portion of metal body 30, the gap between the two surfaces of adjacent peripheral walls 36 may be welded or filled with a metal sheet, a metal tape, a metal plate, a metal paste, or the like to achieve seamless portion 301. In this case, even in case 3 formed in a box shape by bending a metal sheet, seamless portion 301 may be achieved by filling at least a part of a gap generated at a joint or the like of the bent metal sheet by the above method.

In addition, in the first exemplary embodiment, an example in which entire case 3 is formed of metal body 30 has been described, but the present invention is not limited thereto. That is, the fact that entire case 3 is metal body 30 is not an essential configuration of effective component generation device 1. For example, only a part of case 3 may be formed of metal body 30 made of metal. Specifically, case 3 may be configured in a form including the metal body and the resin molded article by integrating the metal body and the resin molded article by, for example, insert molding or the like. Alternatively, case 3 may be formed by forming a metal body on the surface of the resin molded article by a method such as metal plating or attaching a metal sheet to the resin molded article.

Further, in the first exemplary embodiment, an example in which buffer 41 is formed of ethylene propylene diene rubber (EPDM) foam has been described, but buffer 41 may be formed of a cushion material such as polyurethane foam. Furthermore, buffer 41 may be achieved by a member having elasticity, such as a rubber member, a polyurethane member, a sponge, or a spring member (including a leaf spring), in addition to the cushion material. Even in these cases, buffer 41 is pressed against a part of internal components 2 (for example, air blower 22) by the elasticity of buffer 41.

In the first exemplary embodiment, the configuration in which buffer 41 is in contact with air blower 22 of internal components 2 has been described as an example, but the present invention is not limited thereto. For example, buffer 41 may be sandwiched between lid body 4 and a part of internal components 2. Therefore, for example, buffer 41 may be sandwiched between transformer 25 that is a part of internal components 2 and lid body 4. In this case, transformer 25 is pressed against bottom surface 310 of bottom plate 35 of case 3 by the elastic force of buffer 41. As a result, effects such as retention stability can be obtained.

In the first exemplary embodiment, an example in which discharge electrode 211 and counter electrode 212 are made of a titanium alloy (Ti alloy) has been described, but the present invention is not limited thereto. For example, as an example, a copper alloy such as a copper-tungsten alloy (Cu—W alloy) may be used. As a result, an effect such as cost reduction can be obtained.

In the first exemplary embodiment, the tip of discharge electrode 211 is tapered. Alternatively, the tip of discharge electrode may be bulged. As a result, an effect such as an increase in the dew condensation water retention amount can be obtained.

Further, in the first exemplary embodiment, the case where the high voltage applied from drive circuit 23 to discharger 21 is about 6.0 kV has been described as an example, but the present invention is not limited thereto. The voltage is preferably appropriately set according to, for example, the shapes of discharge electrode 211 and counter electrode 212, or the distance between discharge electrode 211 and counter electrode 212.

The fixing structure of internal components 2 is not limited to the structure described in the first exemplary embodiment. In the first exemplary embodiment, for example, the configuration in which circuit board 230 is fixed to fixing portion 61 using the fasteners such as screw 71 and nut 72 has been described as an example, but the present invention is not limited thereto. For example, it may be achieved by caulking, adhesion, snap-fit, or the like. The bonding includes bonding using an adhesive or an adhesive tape.

In the first exemplary embodiment, case 3 and lid body 4 are joined to each other by caulking. However, the present disclosure is not limited to this. For example, welding, joining using a fastener, bonding, or the like may be used. In a case of joining using a fastener, joining using a screw, a rivet, or the like is included. Further, even in a case of welding other than caulking, it is preferable to join case 3 and lid body 4 by welding the plurality of joints 80 to 89 positioned around opening 33 as in the first exemplary embodiment.

In the first exemplary embodiment, the configuration in which the electric connection between the reference potential point of drive circuit 23 and metal body 30 is achieved by the contact between support portions 62 (connecting portion 621) and fixing portion 61, and conductive pad 231 of drive circuit 23 has been described as an example. However, the present disclosure is not limited to this. For example, the reference potential point of drive circuit 23 and metal body 30 may be connected by a member such as a lead wire, a harness, or a screw to achieve electrical connection between the reference potential point of drive circuit 23 and metal body 30. Accordingly, a stronger connection can be achieved.

In the first exemplary embodiment, the configuration including liquid supply unit 24 has been described as an example. However, liquid supply unit 24 is not an essential component of effective component generation device 1, and thus may be omitted as appropriate. In this case, discharger 21 is configured to generate an effective component such as negative ions by discharge (full-scale dielectric breakdown discharge or partial dielectric breakdown discharge) generated between discharge electrode 211 and counter electrode 212. As a result, an effect such as cost reduction can be obtained.

In the first exemplary embodiment, liquid supply unit 24 configured to cool discharge electrode 211 to generate dew condensation water has been described as an example. However, the present disclosure is not limited to the first exemplary embodiment. Liquid supply unit 24 may be configured to supply liquid from a tank to discharge electrode 211 by using a capillary phenomenon or a supply mechanism such as a pump, for example. As a result, an effect such as cost reduction can be obtained. Furthermore, the liquid is not limited to water (including dew condensation water), and may be, for example, a functional liquid having a sterilizing action other than water.

In addition, in the first exemplary embodiment, the configuration has been described as an example in which drive circuit 23 applies a high voltage between discharge electrode 211 and counter electrode 212 with discharge electrode 211 as a negative electrode (ground) and counter electrode 212 as a positive electrode, but the present disclosure is not limited thereto. For example, a high voltage may be applied between the electrodes with discharge electrode 211 as a positive electrode and counter electrode 212 as a negative electrode (ground). Furthermore, the object of the present disclosure can be achieved as long as a potential difference (voltage) is generated between discharge electrode 211 and counter electrode 212. Therefore, drive circuit 23 may be configured such that the electrode on the high potential side (positive electrode) is set to the ground, the electrode on the low potential side (negative electrode) is set to the negative potential, and a negative voltage is applied to discharger 21. This can reduce the risk of electric shock caused by touching the electrode on the high potential side.

In the comparison between the two values in the first exemplary embodiment, "equal to or more than" includes both a case where the two values are equal to each other and a case where one of the two values exceeds the other. However, the present disclosure is not limited to this definition, and "more than or equal to" herein may be synonymous with "more than" including only the case where one of the two values exceeds the other. That is, whether or not the case where the two values are equal to each other is included can be arbitrarily changed depending on setting of a threshold value or the like. Therefore, there is no technical difference between "more than or equal to" and "more than". Similarly, "less than" may be synonymous with "equal to or less than".

Second Exemplary Embodiment

Hereinafter, effective component generation device 1A according to a second exemplary embodiment will be described with reference to FIGS. 11A to 12B.

As illustrated in FIGS. 11A to 12B, effective component generation device 1A according to the second exemplary embodiment is different from effective component generation device 1 according to the first exemplary embodiment in that it includes shield wall 46. Hereinafter, common reference numerals denote the same constituent elements as those of the first exemplary embodiment, and descriptions of the constituent elements will be omitted as appropriate.

Shield wall 46 of effective component generation device 1A is provided on lid body 4, and is disposed in case 3 at a position overlapping discharger 21 when viewed from discharge port 31. In other words, shield wall 46 is disposed at a position between discharger 21 and discharge port 31 in plan view.

As illustrated in FIGS. 11B to 12B, shield wall 46 provided on lid body 4 is inserted into a space between discharger 21 and discharge port 31 when lid body 4 and case 3 are combined.

Case 3 has discharge port 31 formed to discharge the effective component generated in discharger 21 to the outside of case 3. Shield wall 46 is disposed at a position corresponding to discharge port 31 in case 3. As a result, shield wall 46 shields electromagnetic noise generated in discharger 21 and the like. As a result, shield wall 46 reduces emission of the electromagnetic noise to the outside of case 3 through discharge port 31.

Shield wall 46 is made of a conductive metal sheet such as SECC.

Figure 12A:
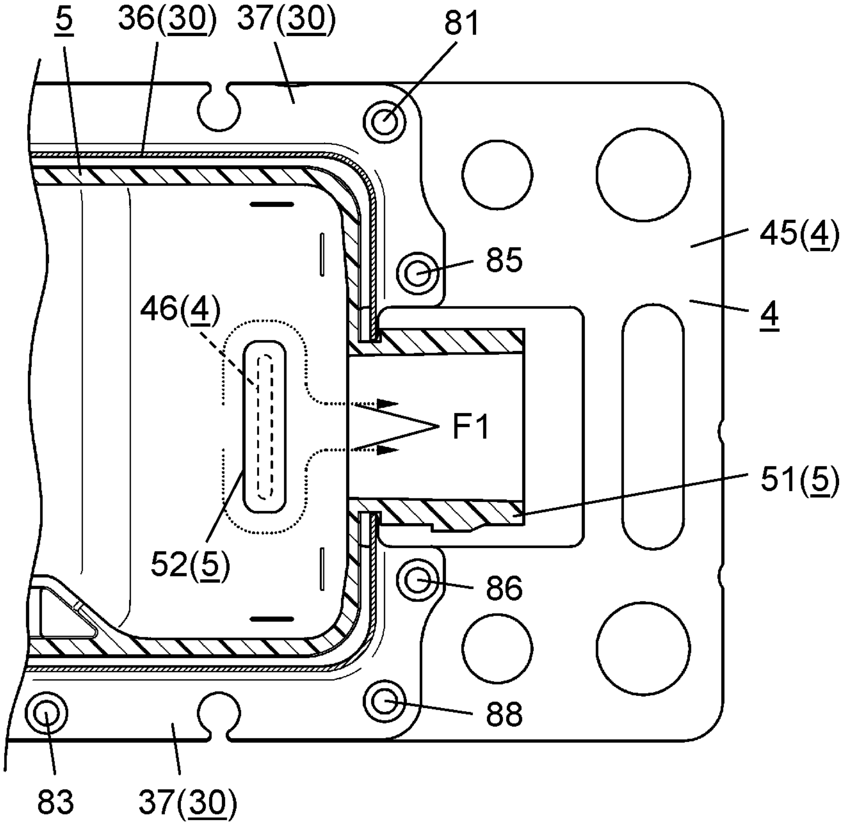
FIG. 12A is a perspective view illustrating a main part of the effective component generation device in a partially broken state.
Figure 12B:
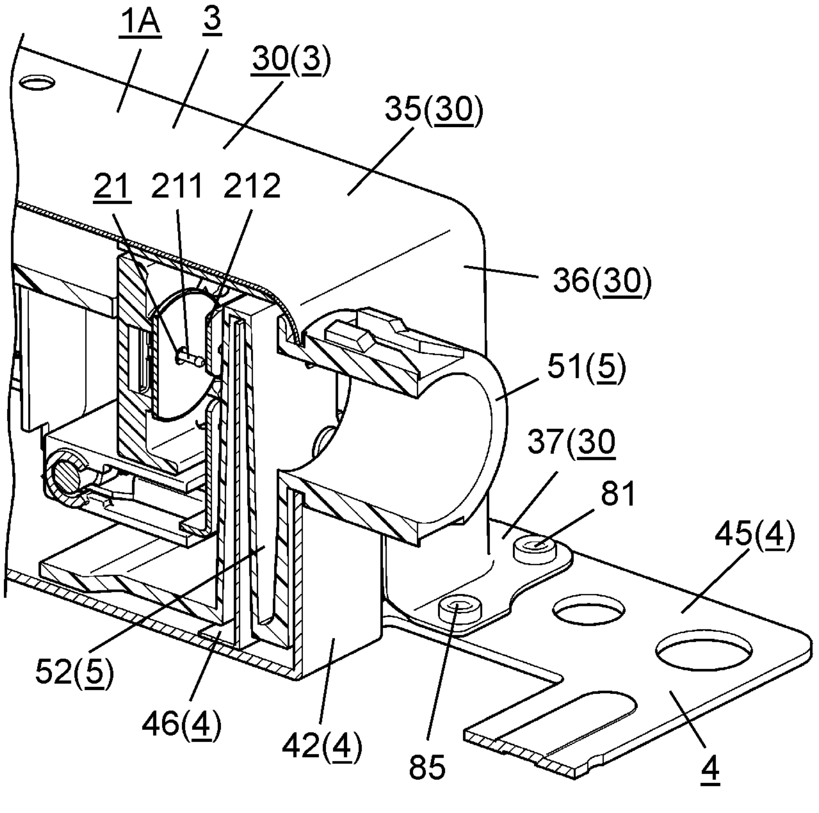
FIG. 12B is a partially cutaway plan view illustrating the main part of the effective component generation device in a partially broken state.

As illustrated in FIG. 12B, shield wall 46 is formed in a substantially L shape (including an L shape), and one side (short side) thereof is joined to lid body 4. Therefore, the other side (long side) of shield wall 46 extends substantially perpendicularly (including perpendicularly) to lid body 4. Shield wall 46 is electrically connected to lid body 4 and case 3 (metal body 30) by being joined to lid body 4. At this time, metal body 30 is electrically connected to a reference potential point (ground) of drive circuit 23. Therefore, shield wall 46 is electrically connected to the reference potential point of drive circuit 23 via lid body 4 and metal body 30.

Further, shield wall 46 is covered with electrically insulating protective member 52 such as PBT. In the second exemplary embodiment, the entire circumference (including the apex portion) of shield wall 46 in plan view is covered with protective member 52. As a result, even when the effective component generated in discharger 21 is charged, the charged effective component is less likely to be adsorbed to shield wall 46. Therefore, as illustrated in FIG. 12A, the effective component generated in discharger 21 is carried on air flow F1 bypassing shield wall 46 and protective member 52, and is smoothly discharged from nozzle 51 disposed in discharge port 31 of case 3 to the outside of case 3 without being adsorbed to shield wall 46.

In the second exemplary embodiment, as illustrated in FIG. 12B, protective member 52 is formed integrally with air passage member 5. That is, air passage member 5 is molded integrally with nozzle 51 and protective member 52. Therefore, even if protective member 52 is provided, an increase in a number of parts can be suppressed.

In the second exemplary embodiment, a configuration in which an electric connection between the reference potential point of drive circuit 23 and shield wall 46 is achieved by the bonding between lid body 4 and shield wall 46 has been described as an example, but the present disclosure is not limited thereto. For example, the reference potential point of drive circuit 23 and shield wall 46 may be connected by a member such as a lead wire, a harness, or a screw to achieve electrical connection between the reference potential point of drive circuit 23 and shield wall 46.

In the second exemplary embodiment, an example in which protective member 52 is integrally formed with air passage member 5 has been described, but the present disclosure is not limited thereto. Protective member 52 may be achieved by, for example, an electrically insulating tape (insulating tape) covering shield wall 46 or an electrically insulating coating film. Further, shield wall 46 and air passage member 5 may be integrally formed by insert molding air passage member 5 with shield wall 46 as an insert product. As a result, effects such as improvement in assemblability can be obtained.

In addition, the various configurations described in the second exemplary embodiment may be appropriately combined with the various configurations described in the first exemplary embodiment to constitute an effective component generation device.

CONCLUSION

As described above, effective component generation device (1, 1A) of the present disclosure includes internal components (2) and case (3). Internal components (2) include discharger (21) that generates an effective component. Case (3) is formed in a box shape having discharge port (31) through which an effective component is discharged, and houses internal components (2). Case (3) includes metal body (30) including bottom plate (35) surrounding at least discharger (21) and peripheral walls (36) among internal components (2). Metal body (30) has seamless portion (301) at a corner portion between two surfaces of adjacent peripheral walls (36) oriented in different directions.

According to this configuration, at least discharger (21) is surrounded by metal body (30) of case (3). Therefore, metal body (30) functions as a shield against the electromagnetic noise of discharger (21), generated at the time of discharge. Further, metal body (30) has seamless portion (301) at a corner portion between two surfaces of adjacent peripheral walls (36) oriented in different directions. Therefore, the electromagnetic noise leaking from the corner portion between the two surfaces of adjacent peripheral walls (36) can be reduced by seamless portion (301). As a result, emission of the electromagnetic noise to the outside of case (3) can be suppressed, and an influence of the electromagnetic noise on the electrical equipment and the like disposed outside can be further reduced.

Effective component generation device (1, 1A) of the present disclosure further includes lid body (4). Lid body (4) is joined to case (3). Case (3) has opening (33) provided at a position different from discharge port (31). Lid body (4) is joined to case (3) so as to close opening (33) in a state where internal components (2) are housed between lid body (4) and case (3).

According to this configuration, internal components (2) can be housed in case (3) through opening (33). Further, lid body (4) closes opening (33). This makes it possible to reduce the electromagnetic noise leaking from opening (33).

In effective component generation device (1, 1A) of the present disclosure, case (3) and lid body (4) are joined to each other at a plurality of joints. The plurality of joints are disposed at positions around opening (33) and include at least first joint (81), second joint (82), third joint (83), and fourth joint (84). First joint (81), second joint (82), third joint (83), and fourth joint (84) are disposed such that first straight line (L1) connecting first joint (81) and second joint (82) and second straight line (L2) connecting third joint (83) and fourth joint (84) intersect each other in opening (33).

According to this configuration, the plurality of joints for joining case (3) and lid body (4) are disposed over the entire periphery of opening (33) so as to surround opening (33). Accordingly, a gap is hardly generated between case (3) and lid body (4). As a result, the electromagnetic noise leaking from the gap can be reduced.

Effective component generation device (1, 1A) of the present disclosure further includes buffer (41). Buffer (41) is sandwiched between lid body (4) and a part of internal components (2). An intersection of first straight line (L1) and second straight line (L2) is located on buffer (41) when viewed from one side in the joining direction between case (3) and lid body (4).

According to this configuration, lid body (4) can easily suppress a reaction force received from buffer (41). This makes it possible to suppress floating of lid body (4) due to the reaction force of buffer (41) or deformation of lid body (4) due to the reaction force. As a result, a gap is hardly generated between the peripheral edge (flange (37)) of opening (33) of case (3) and lid body (4). As a result, the electromagnetic noise leaking from the gap can be reduced.

In effective component generation device (1, 1A) of the present disclosure, internal components (2) further include air blower (22). Air blower (22) generates an air flow for outputting the effective component from discharge port (31) to the outside of case (3). Buffer (41) is disposed in contact with at least air blower (22).

According to this configuration, the vibration generated in air blower (22) and transmitted to case (3) or lid body (4) can be absorbed and reduced by buffer (41).

In effective component generation device (1, 1A) of the present disclosure, the plurality of joints include corner joints (81, 82, 87, 88) disposed at corner portions of opening (33).

According to this configuration, the vicinity of the corner portion of opening (33) of case (3) can suppress the occurrence of curling due to catching in the manufacturing step, the assembling step, or the like of effective component generation device (1, 1A). That is, even when a part of the corner portions of opening (33) is caught in each step, the corner joints prevent case (3) from curling. With such a configuration, it is possible to more reliably avoid expansion of a gap formed between case (3) and lid body (4).

In effective component generation device (1, 1A) of the present disclosure, internal components (2) further include drive circuit (23). Drive circuit (23) drives discharger (21).

According to this configuration, the emission of the electromagnetic noise generated in drive circuit (23) to the outside is suppressed by metal body 30 of case 3. As a result, it is possible to reduce the influence of the electromagnetic noise on the electrical equipment and the like outside case (3).

In effective component generation device (1, 1A) of the present disclosure, drive circuit (23) includes transformer (25). Transformer (25) includes coiled portion (251) and connection terminal (252) connected to discharger (21). Discharger (21) and connection terminal (252) are disposed at positions opposite to each other as viewed from coiled portion (251).

According to this configuration, coiled portion (251) is disposed at a position away from case (3). This makes it easy to suppress leakage of electromagnetic noise to the outside of case (3).

In effective component generation device (1, 1A) of the present disclosure, drive circuit (23) includes a reference potential point. The reference potential point is electrically connected to metal body (30).

According to this configuration, the potential of metal body (30) becomes the reference potential point. As a result, the potential of metal body (30) is stabilized. As a result, it is possible to suppress generation of the electromagnetic noise due to potential fluctuation and to improve the shielding effect.

In effective component generation device (1, 1A) of the present disclosure, case (3) has support portions (62). Support portions (62) support circuit board (230) included in drive circuit (23). Support portions (62) are formed integrally with metal body (30). Support portions (62) further include connecting portion (621). Connecting portion (621) is electrically connected to the reference potential point by contact with circuit board (230).

According to this configuration, the support of circuit board (230) via support portions (62) also serves as an electrical connection between metal body (30) and reference potential point. Thus, the electrical connection configuration between metal body (30) and the reference potential point can be simplified.

In effective component generation device (1, 1A) of the present disclosure, case (3) has fixing portion (61). Fixing portion (61) fixes circuit board (230) to bottom surface (310) of case (3). Fixing portion (61) is formed integrally with metal body (30). Fixing portion (61) is electrically connected to the reference potential point by contact with circuit board (230). Fixing portion (61) is lower in height from bottom surface (310) of case (3) than connecting portion (621).

According to this configuration, fixing portion (61) and connecting portion (621) can be reliably brought into contact with circuit board (230). As a result, metal body (30) and the reference potential point can be electrically connected by both fixing portion (61) and connecting portion (621).

In effective component generation device (1, 1A) of the present disclosure, case (3) has restriction portions (63). Restriction portions (63) are provided at a position between bottom surface (310) of case (3) and circuit board (230). Restriction portions (63) regulate movement of circuit board (230) in a direction approaching bottom surface (310). Restriction portions (63) are lower in height from bottom surface (310) of case (3) than fixing portion (61).

According to this configuration, a gap is basically provided between each of restriction portions (63) and circuit board (230). Therefore, it is possible to suppress occurrence of warpage or the like of circuit board (230) due to contact of restriction portions (63) with circuit board (230).

In effective component generation device (1, 1A) of the present disclosure, case (3) has fixing portion (61). Fixing portion (61) fixes internal components (2) to bottom surface (310) of case (3). Fixing portion (61) is formed integrally with metal body (30). Fixing portion (61) is provided continuously and seamlessly with metal body (30).

According to this configuration, no gap is formed between fixing portion (61) and metal body (30). Accordingly, leakage of the electromagnetic noise from the gap can be more reliably reduced.

Effective component generation device (1, 1A) of the present disclosure further includes shield wall (46). Shield wall (46) is disposed at a position overlapping discharger (21) as viewed from discharge port (31) in case (3).

According to this configuration, the electromagnetic noise leaking from discharge port (31) can be reduced by shield wall (46).

A method for manufacturing effective component generation device (1, 1A) of the present disclosure includes a case (3) forming step and a housing step. Effective component generation device (1, 1A) includes internal components (2) and case (3). Internal components (2) include discharger (21) that generates an effective component. Case (3) is formed in a box shape having discharge port (31) for discharging the effective component, and houses internal components (2). The case forming step is a step of forming case (3) by drawing a metal sheet. The housing step is a step of housing internal parts (2) in case (3).

According to this configuration, at least discharger (21) is surrounded by case (3) made of a metal sheet. Therefore, case (3) functions as a shield against electromagnetic noise of discharger (21) generated at the time of discharge. Case (3) is formed by drawing a metal sheet. Therefore, in metal body (30), it is possible to reduce a gap generated at the corner portion between the two surfaces of adjacent peripheral walls 36 oriented in different directions. This makes it possible to reduce electromagnetic noise leaking from the gap at a corner portion between two surfaces of adjacent peripheral walls (36). That is, radiation of the electromagnetic noise to the outside of case (3) can be suppressed, and an influence of the electromagnetic noise on the external electrical equipment and the like can be reduced.

The above configuration of the present disclosure is not essential for effective component generation device (1, 1A), and can be omitted as appropriate. Accordingly, it is possible to provide appropriate effective component generation device (1, 1A) according to the application and the like.

INDUSTRIAL APPLICABILITY

The effective component generation device of the present disclosure can be applied to various applications such as a refrigerator, a washing machine, a dryer, an air conditioner, an electric fan, an air purifier, a humidifier, a facial treatment device, and an automobile in which suppression of radiation of electromagnetic noise is desired.

REFERENCE MARKS IN THE DRAWINGS

1, 1A: effective component generation device
2: internal component
3: case
4: lid body
5: air passage member
21: discharger
22: air blower
23: drive circuit
24: liquid supply unit
25: transformer
26: harness
27: connector
30: metal body
31: discharge port
32: air supply port
33: opening
34: connector port
35: bottom plate
36: peripheral wall
37: flange
41: buffer
42: first closing piece
43: second closing piece
44: rib
45: overhanging portion
46: shield wall
51: nozzle
52: protective member
61: fixing portion
62: support portion
63: restriction portion
71: screw
72: nut
80: tenth joint
81: first joint (corner joint)
82: second joint (corner joint)
83: third joint
84: fourth joint
85: fifth joint
86: sixth joint
87: seventh joint (corner joint)
88: eighth joint (corner joint)
89: ninth joint portion
211: discharge electrode
211*a*: distal end
212: counter electrode
212*a*: through-hole
212*b*: projecting electrode portion
213: holding block
230: circuit board
231: conductive pad
251: coiled portion
252: connection terminal

301: seamless portion
310: bottom surface
621: connecting portion
L1: first straight line
L2: second straight line

The invention claimed is:

1. An effective component generation device comprising:

an internal device including a discharger that generates an effective component;

a case having a box shape having a discharge port through which the effective component is discharged, the case housing the internal device; and a lid body joined to the case, wherein:

the case includes a metal body including a bottom plate and peripheral walls, the bottom plate and the peripheral walls surrounding at least the discharger in the internal device, the metal body includes a seamless portion at a corner portion between two surfaces of adjacent peripheral walls oriented in different directions, the case has an opening provided at a position different from a position of the discharge port, and the lid body is joined to the case, closing the opening in a state where the internal device is housed between the lid body and the case, the case and the lid body are joined to each other at a plurality of joints disposed at positions around the opening, the plurality of joints including at least a first joint, a second joint, a third joint, and a fourth joint, and the first joint, the second joint, the third joint, and the fourth joint are disposed in such a manner that a first straight line connecting the first joint and the second joint and a second straight line connecting the third joint and the fourth joint intersect each other in the opening.

2. The effective component generation device according to claim 1, further comprising a buffer sandwiched between the lid body and a part of the internal device, wherein an intersection of the first straight line and the second straight line is located on the buffer when viewed from one side in a joining direction between the case and the lid body.

3. The effective component generation device according to claim 2, wherein the internal device further includes an air blower that generates an air flow for outputting the effective component from the discharge port to an outside of the case, and the buffer is disposed so as to be in contact with at least the air blower.

4. The effective component generation device according to claim 1, wherein the plurality of joints includes a corner joint disposed at a corner of the opening.

5. The effective component generation device according to claim 1, wherein the internal device further includes a drive circuit that drives the discharger.

6. The effective component generation device according to claim 5, wherein the drive circuit includes a transformer, the transformer includes a coiled portion and a connection terminal connected to the discharger, and the discharger and the connection terminal are disposed at positions opposite to each other as viewed from the coiled portion.

7. The effective component generation device according to claim 5, wherein the drive circuit includes a reference potential point, and the reference potential point is electrically connected to the metal body.

8. The effective component generation device according to claim 7, wherein the case includes a support portion that supports a circuit board included in the drive circuit, and the support portion further includes a connecting portion formed integrally with the metal body and electrically connected to the reference potential point by contact with the circuit board.

9. The effective component generation device according to claim 8, wherein the case includes a fixing portion that fixes the circuit board to a bottom surface of the bottom plate of the case, the fixing portion is formed integrally with the metal body, and is electrically connected to the reference potential point by contact with the circuit board, and a height of the fixing portion from the bottom surface of the case is lower than a height of the connecting portion.

10. The effective component generation device according to claim 9, wherein the case includes a restriction portion that is provided between the bottom surface of the bottom plate of the case and the circuit board, and restricts movement of the circuit board in a direction approaching the bottom surface, and a height of the restriction portion from the bottom surface of the case is lower than the height of the fixing portion.

11. The effective component generation device according to claim 1, wherein the case includes a fixing portion that fixes the internal device to the bottom surface of the bottom plate of the case, and the fixing portion is integrally formed with the metal body and continuously formed with the metal body without a seam.

12. The effective component generation device according to claim 1, further comprising a shield wall disposed at a position overlapping the discharger as viewed from the discharge port in the case.

13. An effective component generation device comprising:

an internal device including a discharger that generates an effective component; and a case having a box shape having a discharge port through which the effective component is discharged, the case housing the internal device, wherein:

the case includes a metal body including a bottom plate and peripheral walls, the bottom plate and the peripheral walls surrounding at least the discharger in the internal device, the metal body includes a seamless portion at a corner portion between two surfaces of adjacent peripheral walls oriented in different directions, the internal device further includes a drive circuit that drives the discharger, the drive circuit includes a transformer, the transformer includes a coiled portion and a connection terminal connected to the discharger, and the discharger and the connection terminal are disposed at positions opposite to each other as viewed from the coiled portion.

14. An effective component generation device comprising:

an internal device including a discharger that generates an effective component; and a case having a box shape having a discharge port through which the effective component is discharged, the case housing the internal device, wherein:

the case includes a metal body including a bottom plate and peripheral walls, the bottom plate and the peripheral walls surrounding at least the discharger in the internal device, the metal body includes a seamless portion at a corner portion between two surfaces of adjacent peripheral walls oriented in different directions, the internal device further includes a drive circuit that drives the discharger, the drive circuit includes a reference potential point, and the reference potential point is electrically connected to the metal body.

15. An effective component generation device comprising:

an internal device including a discharger that generates an effective component; and a case having a box shape having a discharge port through which the effective component is discharged, the case housing the internal device, wherein:

the case includes a metal body including a bottom plate and peripheral walls, the bottom plate and the peripheral walls surrounding at least the discharger in the internal device, the metal body includes a seamless portion at a corner portion between two surfaces of adjacent peripheral walls oriented in different directions, the case includes a fixing portion that fixes the internal device to the bottom surface of the bottom plate of the case, and the fixing portion is integrally formed with the metal body and continuously formed with the metal body without a seam.

* * * * *